US012032322B2

(12) United States Patent
Takayama et al.

(10) Patent No.: US 12,032,322 B2
(45) Date of Patent: Jul. 9, 2024

(54) IMAGE FORMING APPARATUS

(71) Applicant: CANON KABUSHIKI KAISHA, Tokyo (JP)

(72) Inventors: Toshihiko Takayama, Kanagawa (JP); Shuichi Tetsuno, Kanagawa (JP); Jun Hara, Kanagawa (JP); Mikihiko Hamada, Kanagawa (JP); Kazuhiro Funatani, Kanagawa (JP); Shinsuke Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/080,992

(22) Filed: Dec. 14, 2022

(65) Prior Publication Data

US 2023/0195025 A1 Jun. 22, 2023

(30) Foreign Application Priority Data

Dec. 17, 2021 (JP) ................................ 2021-205087
Dec. 17, 2021 (JP) ................................ 2021-205132

(51) Int. Cl.
*G03G 21/00* (2006.01)
*G03G 15/02* (2006.01)
*G03G 21/08* (2006.01)

(52) U.S. Cl.
CPC ..... *G03G 21/0082* (2013.01); *G03G 15/0233* (2013.01); *G03G 21/0035* (2013.01);
(Continued)

(58) Field of Classification Search
CPC ........... G03G 21/0064; G03G 15/0233; G03G 21/0035; G03G 21/0082; G03G 21/08;
(Continued)

(56) References Cited

U.S. PATENT DOCUMENTS 4,660,962 A * 4/1987 Maekawa .......... G03G 21/0035 399/354
6,219,505 B1 * 4/2001 Sato .................. G03G 21/0064 399/349

(Continued)

FOREIGN PATENT DOCUMENTS

JP S6420587 A 1/1989
JP H09258622 A 10/1997

(Continued)

OTHER PUBLICATIONS

Extended European Search Report issued in European Appln. No. 22213762.2, dated Oct. 2, 2023.

*Primary Examiner* — Benjamin R Schmitt
(74) *Attorney, Agent, or Firm* — ROSSI, KIMMS & McDOWELL LLP

(57) ABSTRACT

An image forming apparatus including an image bearing member, a charging member, a developing roller, a transfer roller, and a brush configured to be brought into contact with a surface of the image bearing member on a side downstream of a transfer portion and upstream of a charging portion in a rotation direction of the image bearing member and in which, wherein, after the transfer of a developer image onto a transferred member, a developer remaining on the surface of the image bearing member is collected by the developing roller, the brush is disposed such that, in a cross section perpendicular to a rotation axis of the image bearing member, a contact region of the surface of the image bearing member in contact with the brush overlaps a virtual line containing the rotation axis of the image bearing member and extending upward from the rotation axis in a vertical direction.

12 Claims, 23 Drawing Sheets

(52) U.S. Cl.
CPC ......... *G03G 21/0064* (2013.01); *G03G 21/08* (2013.01); *G03G 2221/001* (2013.01); *G03G 2221/0042* (2013.01); *G03G 2221/0063* (2013.01); *G03G 2221/0089* (2013.01)

(58) Field of Classification Search
CPC ..... G03G 2221/001; G03G 2221/0042; G03G 2221/0063; G03G 2221/0089
See application file for complete search history.

(56) References Cited

U.S. PATENT DOCUMENTS

| | | | | |
|---|---|---|---|---|
| 6,871,030 | B2 | 3/2005 | Nishimura | |
| 7,469,116 | B2 | 12/2008 | Kitajima | |
| 7,751,753 | B2 | 7/2010 | Sakagawa et al. | |
| 11,397,400 | B2 | 7/2022 | Funatani et al. | |
| 2007/0122190 | A1* | 5/2007 | Kitajima ............ | G03G 21/0035 399/129 |
| 2008/0152387 | A1* | 6/2008 | Kubo ................. | G03G 21/0064 399/150 |
| 2021/0382430 | A1 | 12/2021 | Funatani et al. | |

FOREIGN PATENT DOCUMENTS

| | | | |
|---|---|---|---|
| JP | H10247036 | A | 9/1998 |
| JP | H11242355 | A | 9/1999 |
| JP | 2003029592 | A | 1/2003 |
| JP | 2003271030 | A | 9/2003 |
| JP | 2007025606 | A | 2/2007 |
| JP | 2007155845 | A | 6/2007 |
| JP | 2008151928 | A | 7/2008 |
| JP | 2021189358 | A | 12/2021 |

* cited by examiner

IMAGE FORMING APPARATUS

BACKGROUND OF THE INVENTION

Field of the Invention

The present invention relates to an image forming apparatus.

Description of the Related Art

As an image recording method to be used for an image forming apparatus such as a printer or a copier, an electrophotographic system is known. The electrophotographic system is a method in which an electrophotographic process is used to form an electrostatic latent image on a photosensitive drum with a laser beam, and the electrostatic latent image is developed with a charged color material (hereinafter referred to as a toner) to form a toner image. Then, the toner image is transferred onto a recording material and fixed to form an image on the recording material. In recent years, in order to reduce a size of the image forming apparatus, a cleaner-less method has been proposed. The cleaner-less method is a method in which the toner remaining on a surface of the photosensitive drum (untransferred toner) after a transfer step is removed from over the photosensitive drum by using a developing member to be collected and re-used. In the cleaner-less method, there is no cleaning unit disposed so as to come into contact with the photosensitive drum, and consequently paper dust adhering onto the photosensitive drum during the transfer step with respect to the recording material may cause an image failure. Accordingly, Japanese Patent Application Publication No. 2003-271030 proposes a configuration in which a brush for collecting the paper dust adhering to the photosensitive drum in the transfer step is disposed downstream of a transfer portion and upstream of a charging portion in a rotation direction of the photosensitive drum.

SUMMARY OF THE INVENTION

However, Japanese Patent Application Publication No. 2003-271030 has the following problem. In the configuration in which the brush is brought into contact with the photosensitive drum, as a result of sheet passage, fine paper dust is accumulated on the brush to form clumps. Then, the paper dust clumps pass therethrough to a downstream side of the brush to inhibit the surface of the photosensitive drum from being charged in a charging step for the photosensitive drum, which may cause an image defect such that dotted black spots appear.

An object of the present invention is to suppress, in an image forming apparatus having a brush to be brought into contact with a photosensitive drum, occurrence of an image defect due to a deposit accumulated on the brush.

An image forming apparatus according to the present invention comprises:

an image bearing member configured to be driven to rotate;

a charging member configured to face a surface of the image bearing member to form a charging portion and charge the surface of the image bearing member;

a developing roller configured to feed a developer to the surface of the image bearing member charged by the charging member to form a developer image;

a transfer roller configured to form a transfer portion between the transfer roller and the image bearing member to transfer the developer image from the image bearing member to a transferred member; and a brush configured to be brought into contact with the surface of the image bearing member on a side downstream of the transfer portion and upstream of the charging portion in a rotation direction of the image bearing member, wherein, after the transfer of the developer image onto the transferred member, the developer remaining on the surface of the image bearing member being collected by the developing roller, wherein the brush is disposed such that, in a cross section perpendicular to a rotation axis of the image bearing member, a contact region of the surface of the image bearing member in contact with the brush overlaps a virtual line containing the rotation axis of the image bearing member and extending upward from the rotation axis in a vertical direction.

An image forming apparatus according to the present invention comprises:

an image bearing member configured to be driven to rotate;

a charging member configured to face a surface of the image bearing member to form a charging portion and charge the surface of the image bearing member;

a developing roller configured to feed a developer charged to a regular polarity to the surface of the image bearing member charged by the charging member to form a developer image;

a transfer roller configured to form a transfer portion between the transfer roller and the image bearing member to transfer the developer image from the image bearing member to a transferred member;

a brush configured to form, on the surface of the image bearing member on a side downstream of the transfer portion and upstream of the charging portion in a rotation direction of the image bearing member, a brush contact portion between the brush and the image bearing member and come into contact with the image bearing member at the brush contact portion;

a voltage applying unit configured to apply a voltage having the regular polarity to the brush; and a pre-exposing unit configured to expose the surface of the image bearing member on a side downstream of the brush contact portion and upstream of the charging portion in the rotation direction of the image bearing member, wherein, after the transfer of the developer image to the transferred member, the developer remaining on the surface of the image bearing member being collected by the developing roller, wherein the pre-exposing unit is configured to expose a downstream-side end portion of the brush contact portion in the rotation direction of the image bearing member.

An image forming apparatus according to the present invention comprises:

an image bearing member configured to be driven to rotate;

a charging member configured to face a surface of the image bearing member to form a charging portion and charge the surface of the image bearing member;

a developing member configured to feed a developer charged to a regular polarity to the surface of the image bearing member charged by the charging member to form a developer image;

a transfer member configured to form a transfer portion between the transfer member and the image bearing member to transfer the developer image from the image bearing member to a transferred member;

a brush configured to form, on the surface of the image bearing member on a side downstream of the transfer portion and upstream of the charging portion in a rotation direction of the image bearing member, a brush contact portion between the brush and the image bearing member and come into contact with the image bearing member at the brush contact portion;

a voltage applying unit configured to apply a voltage having the regular polarity to the brush; and a pre-exposing unit configured to expose the surface of the image bearing member on a side downstream of the brush contact portion and upstream of the charging portion in the rotation direction of the image bearing member, wherein, after the transfer of the developer image to the transferred member, the developer remaining on the surface of the image bearing member being collected by the developing member, wherein a surface potential is formed on the brush contact portion of the surface of the image bearing member so as to satisfy $|Vb|<|Va|$ through the exposure of the surface of the image bearing member by the pre-exposing unit, where Va represents a surface potential of the image bearing member on a side downstream of the transfer portion and upstream of the brush portion in the rotation direction of the image bearing member, and Vb represents a surface potential of the image bearing member on the brush contact portion of the surface of the image bearing member.

An image forming apparatus according to the present invention comprises:

an image bearing member configured to be driven to rotate;

a charging member configured to face a surface of the image bearing member to form a charging portion and charge the surface of the image bearing member;

a developing member configured to feed a developer charged to a regular polarity to the surface of the image bearing member charged by the charging member to form a developer image;

a transfer member configured to form a transfer portion between the transfer member and the image bearing member to transfer the developer image from the image bearing member to a transferred member;

a brush configured to form, on the surface of the image bearing member on a side downstream of the transfer portion and upstream of the charging portion in a rotation direction of the image bearing member, a brush contact portion between the brush and the image bearing member and come into contact with the image bearing member at the brush contact portion;

a voltage applying unit configured to apply a voltage having the regular polarity to the brush; and a pre-exposing unit configured to expose the surface of the image bearing member on a side downstream of the brush contact portion and upstream of the charging portion in the rotation direction of the image bearing member, wherein, after the transfer of the developer image to the transferred member, the developer remaining on the surface of the image bearing member being collected by the developing member, wherein a surface potential is formed so as to satisfy $|Vbmax|>|Vbd|$ through the exposure of the surface of the image bearing member by the pre-exposing unit, where Vb represents a surface potential of the image bearing member on the brush contact portion of the surface of the image bearing member, Vbmax represents a surface potential of the image bearing member at an upstream-side end portion of an exposed area of the brush contact portion which is exposed by the pre-exposing unit in the rotation direction of the image bearing member, and Vbd represents a surface potential of the image bearing member in the vicinity of a downstream-side end portion of a region of the surface of the image bearing member where the exposed area and the brush contact portion overlap each other in the rotation direction of the image bearing member.

An image forming apparatus according to the present invention comprises:

an image bearing member configured to be driven to rotate;

a charging member configured to face a surface of the image bearing member to form a charging portion and charge the surface of the image bearing member;

a developing member configured to feed a developer charged to a regular polarity to the surface of the image bearing member charged by the charging member to form a developer image;

a transfer member configured to form a transfer portion between the transfer member and the image bearing member to transfer the developer image from the image bearing member to a transferred member;

a brush configured to form, on the surface of the image bearing member on a side downstream of the transfer portion and upstream of the charging portion in a rotation direction of the image bearing member, a brush contact portion between the brush and the image bearing member and come into contact with the image bearing member at the brush contact portion;

a voltage applying unit configured to apply a voltage having the regular polarity to the brush; and a pre-exposing unit configured to expose the surface of the image bearing member on a side downstream of the brush contact portion and upstream of the charging portion in the rotation direction of the image bearing member, wherein, after the transfer of the developer image to the transferred member, the developer remaining on the surface of the image bearing member being collected by the developing member, wherein the brush contact portion of the surface of the image bearing member has a part that satisfies $|Von|<|Voff|$, where Von represents a surface potential of the image bearing member where the exposure is performed by the pre-exposing unit, and Voff represents a surface potential of the image bearing member where the exposure is not performed by the pre-exposing unit.

According to the present invention, it is possible to suppress, in the image forming apparatus having the brush to be brought into contact with the photosensitive drum, the occurrence of the image defect due to the deposit accumulated on the brush.

Further features of the present invention will become apparent from the following description of exemplary embodiments with reference to the attached drawings.

DESCRIPTION OF THE EMBODIMENTS

Figure 1:
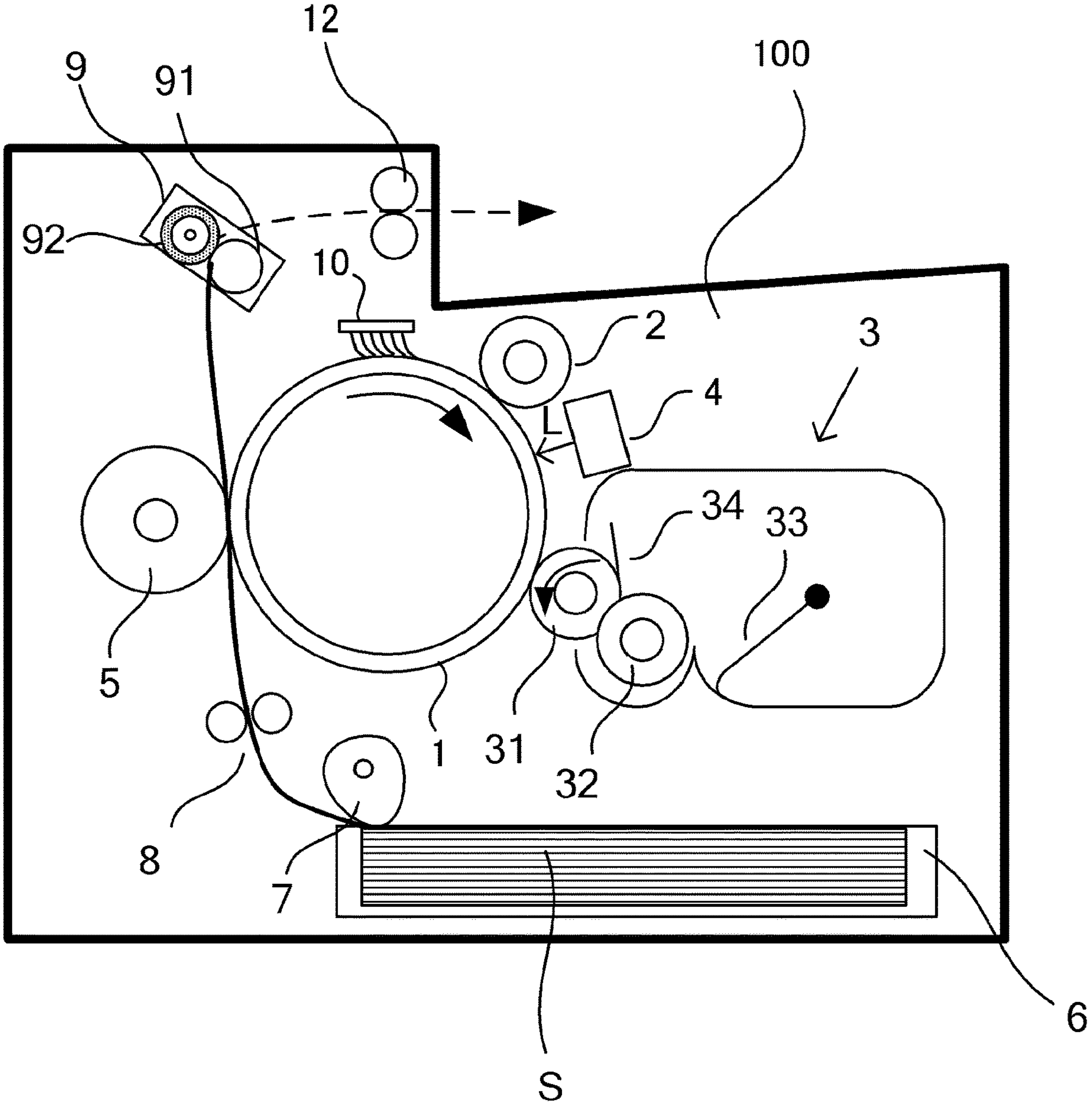
FIG. 1 is an illustrative view of an image forming apparatus in a first embodiment.

Referring to the drawings, forms for carrying out the invention will be described in detail by way of example on the basis of embodiments. Note that dimensions, materials, shapes, relative positioning, and the like of components described in each of the embodiments are to be appropriately changed in accordance with configurations of an apparatus to which the invention is applied and various conditions. That is, it is not intended to limit the scope of the invention to the following embodiments. In addition, terms indicating geometrical shapes or relationships such as parallel, perpendicular, center, straight line, and circle are not limited to mathematically strict meanings unless otherwise specified, and are to be construed as including ranges allowed by manufacturing tolerances or the like.

First Embodiment

1. Image Forming Apparatus

FIG. 1 illustrates a schematic configuration of an embodiment of an image forming apparatus 100 according to the present invention. The image forming apparatus 100 in the first embodiment is a monochrome laser beam printer using a cleaner-less method and a contact charging method. Due to the cleaner-less method, after a developer is transferred onto a transferred member such as a recording material, the developer remaining on a surface of an image bearing member is collected by a developing member.

The image forming apparatus 100 is provided with a photosensitive drum 1 which is a cylindrical photosensitive member serving as the image bearing member. Around the photosensitive drum 1, a charging roller 2 serving as a charging member and a developing device 3 serving as the developing member are provided. In FIG. 1, on a side downstream of the charging roller 2 and upstream of the developing device 3 in a rotation direction of the photosensitive drum 1, an exposing device 4 serving as an exposing unit is provided. With the photosensitive drum 1, a transfer roller 5 serving as a transfer member is in pressure contact.

Figure 2:
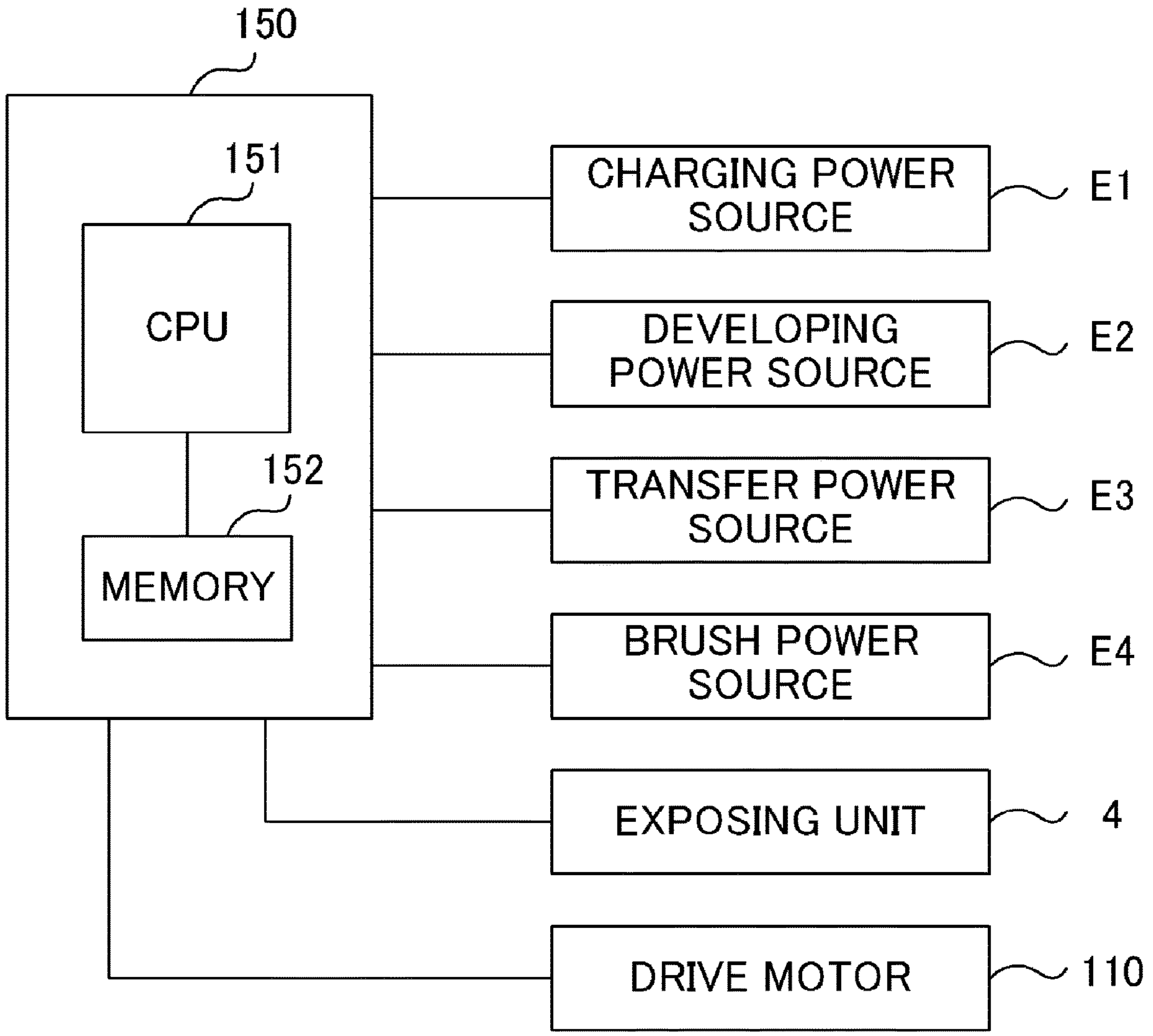
FIG. 2 is a control block diagram in the first embodiment.

The photosensitive drum 1 is a negatively charged organic photosensitive member. The photosensitive drum 1 has a photosensitive layer on a drum-shape aluminum substrate. The photosensitive drum 1 is driven by a drive motor 110 (see FIG. 2) serving as a drive unit to rotate at a predetermined process speed in a direction indicated by the arrow in FIG. 1 (a clockwise direction when viewed in a direction parallel to a rotation axis of the photosensitive drum 1). The process speed is represented by a peripheral speed (surface movement speed) of the photosensitive drum 1. In the first embodiment, it is assumed that the process speed is 140 mm/sec, and an outer diameter of the photosensitive drum 1 is 24 mm.

The charging roller 2 faces a surface of the photosensitive drum 1 and comes into contact therewith under a predetermined pressure contact force to form a charging portion. To the charging roller 2, a predetermined charging voltage (charging bias) is applied from a charging power source E1 (see FIG. 2) serving as a charging voltage applying unit. By the charging roller 2, the surface of the photosensitive drum 1 is uniformly charged to a predetermined potential. In the first embodiment, to the charging roller 2, a negative-polarity dc voltage is applied as a charging voltage, and the surface of the photosensitive drum 1 is uniformly charged by the charging roller 2 to a negative-polarity dark potential Vd. In the first embodiment, it is assumed that the charging voltage is −1300 V, while the dark potential Vd is −700 V. Note that the surface of the photosensitive drum 1 is charged by discharge occurring in at least one of minute gaps between the photosensitive drum 1 and the charging roller 2 which are formed on sides upstream and downstream of a contact portion between the photosensitive drum 1 and the charging roller 2 in the rotation direction of the photosensitive drum 1. The contact portion between the charging roller 2 and the photosensitive drum 1 is referred to as the charging portion.

The exposing device 4 is a laser scanner device and outputs laser light L corresponding to image information input from an external device such as a host computer to perform scanning exposure on the surface of the photosensitive drum 1 uniformly charged to the dark potential Vd. At an exposed portion, a potential of the photosensitive drum 1 changes to a bright potential Vl. By the exposure, on the surface of the photosensitive drum 1, an electrostatic latent image (electrostatic image) corresponding to the image information is formed. In the first embodiment, it is assumed that the bright potential Vl is −100 V. It is assumed that a position on the photosensitive drum 1 subjected to the exposure performed by the exposing device 4 is an exposed portion. Note that the exposing device 4 is not limited to the laser scanner device, and it is also possible to use, e.g., an LED array having a plurality of LEDs arranged along a longitudinal direction (direction parallel to the rotation axis) of the photosensitive drum 1.

A development mode of the image forming apparatus 100 is a contact development mode. The developing device 3 includes a developing roller 31 serving as a developer carrying member, a toner feeding roller 32 serving as a developer feeding unit, a developer containing chamber 33 that contains a toner, and a developing blade 34. The toner fed by the toner feeding roller 32 from the developer containing chamber 33 to the developing roller 31 passes through a blade nip corresponding to a contact portion between the developing roller 31 and the developing blade 34 to be charged to a predetermined polarity. The developing roller 31 comes into contact with the photosensitive drum 1 to thereby perform development. A contact portion between the developing roller 31 and the photosensitive drum 1 is referred to as a developing portion. The toner carried on the developing roller 31 moves, in the developing portion, from the developing roller 31 to the photosensitive drum 1 on the basis of the electrostatic image. The developing roller 31 is driven herein to rotate in a counterclockwise direction (counterclockwise direction when viewed in the direction parallel to the rotation axis of the photosensitive drum 1) such that the photosensitive drum 1 and the developing roller 31 move in a forward direction in the developing portion. Note that it may be possible to use a configuration in which the drive motor 110 that drives the photosensitive drum 1 gives a drive force also to the developing roller 31 or it may also be possible to use a configuration in which another drive motor other than the drive motor 110 that drives the photosensitive drum 1 gives a drive force to the developing roller 31. At the time of development, to the developing roller 31, a predetermined developing voltage (developing bias) is applied from a developing power source E2 (see FIG. 2) serving a developing voltage applying unit. In the first embodiment, the developing voltage is a negative-polarity dc voltage and set to −400 V. To a region of the photosensitive drum 1 where the bright potential Vl is formed, the toner charged to the same polarity (which is a negative polarity in the first embodiment) as a charging polarity of the photosensitive drum 1 adheres. This development mode is referred to as a reversal development mode. Note that, as a development method, not only a mono-component non-magnetic contact development method of the first embodiment, but also a two-component non-magnetic contact development method, a non-contact development method, a magnetic development method, or the like may be used. The two-component non-magnetic contact development method is a method in which a two-component developer including a non-magnetic toner and a magnetic carrier is used as a developer, and the developer (magnetic brush) carried on the developer carrying member is brought into contact with the photosensitive drum 1 to perform development. The non-contact development method is a method in which a toner is caused to jump from a developer carrying member disposed to face a photosensitive member in non-contact relation onto the photosensitive member to perform development. The magnetic development method is a method in which a magnetic toner is magnetically carried on a developer carrying member in which a magnet disposed to face a photosensitive member in contact or non-contact relation to serve as a magnetic field generating unit is embedded to perform development. In the first embodiment, a toner having a center average particle diameter of 6 μm and a negative regular charging polarity is used.

As the transfer roller 5, a transfer roller formed of an elastic member such as sponge rubber made of polyurethane rubber, EPDM (ethylene-propylene-diene rubber), NBR (nitrile butadiene rubber), or the like can appropriately be used. The transfer roller 5 is pressed toward the photosensitive drum 1 to form a transfer portion in which the photosensitive drum 1 and the transfer roller 5 are in pressure contact. At the time of transfer, to the transfer roller 5, a predetermined transfer voltage (transfer bias) is applied from a transfer power source E3 (FIG. 2) serving as a transfer voltage applying unit. In the first embodiment, at the time of transfer, a dc voltage having a polarity (which is a positive polarity in the first embodiment) reverse to the regular polarity of the toner is applied as a transfer voltage to the transfer roller 5. In the first embodiment, it is assumed that the transfer voltage is +1000 V. Then, by the action of an electric field formed between the transfer roller 5 and the photosensitive drum 1, a developer image is electrostatically transferred from the photosensitive drum 1 to a recording material S.

With timing with which a toner image formed on the photosensitive drum 1 reaches the transfer portion, the recording material S stored in a cassette 6 is fed by a paper feeding unit 7 to pass through a resist roller pair 8 and be transported to the transfer portion. The toner image formed on the photosensitive drum 1 is transferred onto the recording material S by the transfer roller 5 to which the predetermined transfer voltage is applied from the transfer power source E3.

The recording material S after the transfer of the toner image is transported to a fixing unit 9. The fixing unit 9 is a film-heating-type fixing unit including a fixing film 91 in which a fixing heater not shown and a thermistor that measures a temperature of the fixing heater and is not shown are embedded, and a pressure roller 92 for pressure contact with the fixing film 91. The recording material S to which the toner image is fixed by being heated and pressurized in the fixing unit 9 passes through a paper discharge roller pair 12 to be discharged to the outside of the apparatus.

The untransferred toner remaining on the photosensitive drum 1 instead of being transferred to the recording material S is removed in the following step. In the untransferred toner, the toner charged to the positive polarity and the toner charged to the negative polarity but not having sufficient charges are present in mixed relation. The untransferred toner is charged to the negative polarity by discharge by the charging roller 2 in the charging portion. The untransferred toner charged to the negative polarity on the charging roller 2 reaches the developing portion with the rotation of the photosensitive drum 1. The electrostatic latent image formed on the surface of the photosensitive drum 1 includes an image portion at the bright potential and a non-image portion at the dark potential. The behavior of the untransferred toner that has reached the developing portion will be described separately for the image portion and the non-image portion of the photosensitive drum 1.

In the image portion of the photosensitive drum 1, the surface of the photosensitive drum 1 is at the bright potential which is a potential higher than that on the developing roller 31, and accordingly particles charged to the negative polarity receive, from the developing roller 31, a force toward the photosensitive drum 1. Consequently, the negative-polarity untransferred toner adhering to the image portion of the photosensitive drum 1 is not transferred from the photosensitive drum 1 to the developing roller 31 in the developing portion, but moves to the transfer portion together with the toner transferred from the developing roller 31 to be transferred to the recording material S and subjected to image formation.

Meanwhile, in the non-image portion of the photosensitive drum 1, the surface of the photosensitive drum 1 is at the dark potential which is a potential lower than that of the developing roller 31 (having a larger absolute value due to the negative polarity), and accordingly the particles charged to the negative polarity receive, from the photosensitive drum 1, a force toward the developing roller 31. As a result, the negative-polarity untransferred toner adhering to the non-image portion of the photosensitive drum 1 is transferred from the photosensitive drum 1 to the developing roller 31 in the developing portion to be collected into the developer containing chamber 33. Note that the untransferred toner collected into the developer containing chamber 33 is used again for image formation.

The image forming apparatus 100 has a control unit 150 that controls operations of the various functional units described above. The control unit 150 has a CPU 151 and a memory 152. The memory 152 includes a volatile memory that temporarily stores information and a nonvolatile memory that retains information over a long period of time. The memory 152 stores the image information acquired from the external device, programs that define control methods for operations of the various functional units, and the like. The CPU 151 input/outputs information to/from the memory 152, acquires and processes the image information, and executes the programs to control an operation of the image forming apparatus 100.

2. Configuration of Brush

The image forming apparatus 100 has a brush 10 to be brought into contact with the surface of the photosensitive drum 1. In the first embodiment, the brush 10 collects paper dust adhering to the surface of the photosensitive drum 1. The brush 10 comes into contact with the surface of the photosensitive drum 1 on a side downstream of the transfer portion and upstream of the charging portion in the rotation direction of the photosensitive drum 1 to form a contact portion. A region of the surface of the photosensitive drum 1 which is in contact with the brush 10 is referred to as a contact region. An upstream-side end portion of the contact region in the rotation direction of the photosensitive drum 1 is referred to as an upstream end, while a downstream-side end portion thereof is referred to as a downstream end.

Figure 3B:
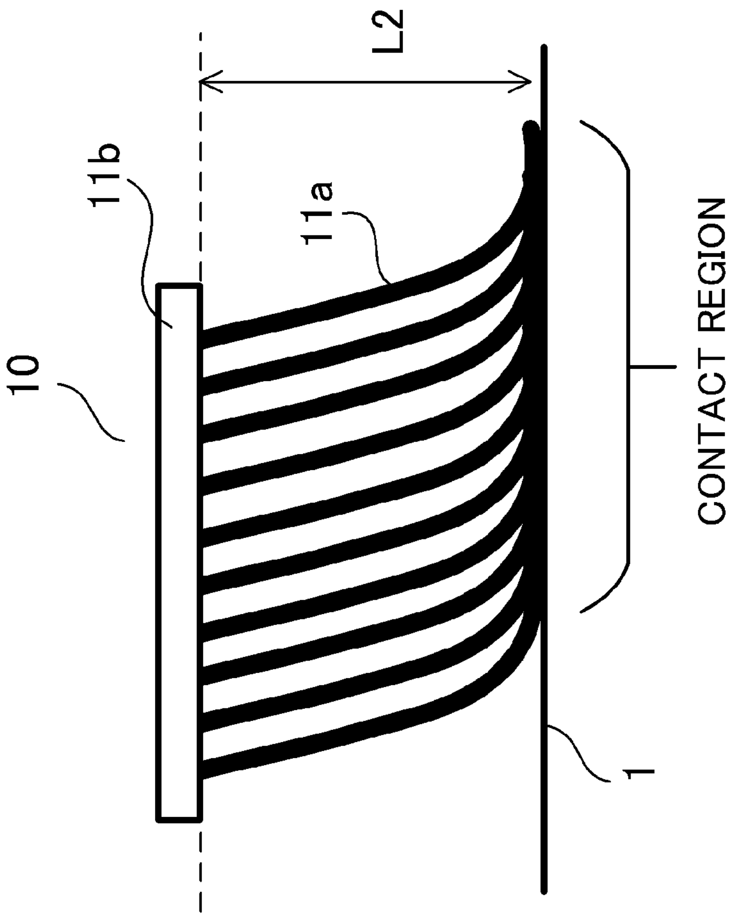
FIGS. 3A and 3B are schematic diagrams of a brush in the first embodiment.
Figure 3A:
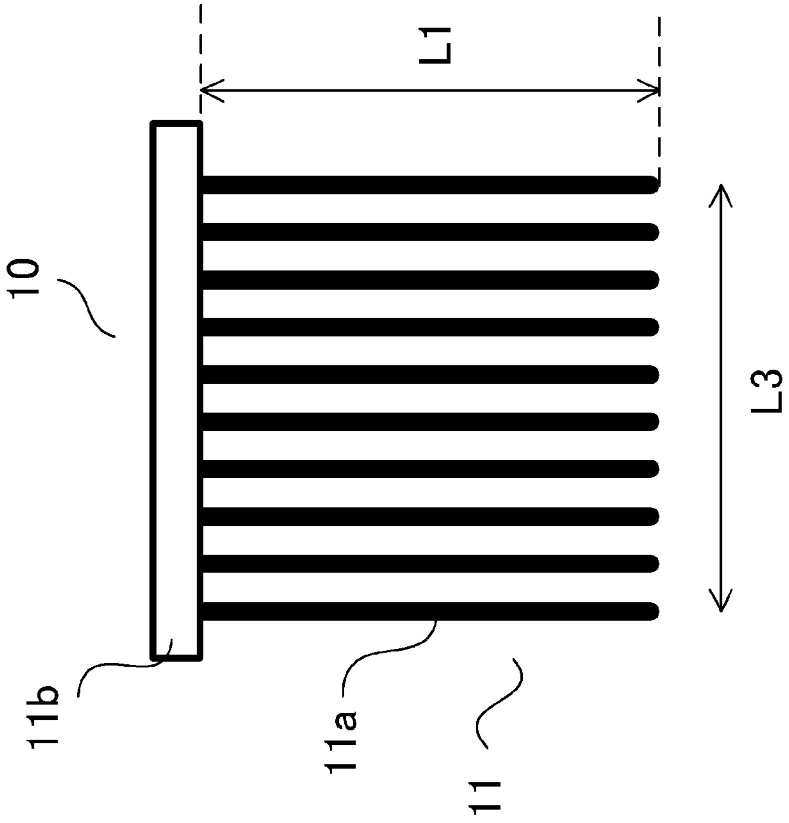

FIG. 3A is a diagram illustrating a cross section made of a virtual surface of the brush 10 in a stand-alone state (state in which the brush 10 is not in contact with the photosensitive drum 1) which is perpendicular to the rotation axis of the photosensitive drum 1. FIG. 3B is a diagram illustrating the foregoing cross section of the brush 10 in a state where the brush 10 is brought into contact with the photosensitive drum 1.

As illustrated in FIGS. 3A and 3B, the brush 10 is a pile fabric having a yarn portion 11 including a plurality of yarns 11*a* made of conductive nylon which are a plurality of hair materials that come into contact with the surface of the photosensitive drum 1 and slidably rub the surface of the photosensitive drum 1 and a base fabric 11*b* that supports the yarn portion 11. The yarns 11*a* extend from the base fabric 11*b* in a perpendicular direction in a state where the yarns 11*a* are not in contact with the photosensitive drum 1. The yarns 11*a* are evenly arranged on the base fabric 11*b*. The brush 10 is disposed so as to come into contact with the photosensitive drum 1 on a side downstream of the transfer portion and upstream of the charging portion in the rotation direction of the photosensitive drum 1.

The brush 10 is disposed such that a longitudinal direction thereof is parallel to a direction of the rotation axis of the photosensitive drum 1. Note that, as a material of the yarns 11*a*, not only nylon (registered trademark), but also rayon, acryl, polyether, or the like can be used. In the first embodiment, as each of the yarns 11*a*, an insulated yarn using a conductive yarn may also be used. The yarns 11*a* are not limited to those formed by twisting fibers as long as the yarns 11*a* are in the form of yarns.

As illustrated in FIG. 3A, it is assumed that a distance from the base fabric 11*b* to a tip of each of the yarns 11*a* extending from the base fabric 11*b* in a stand-alone state of the brush 10, i.e., a state (natural state) where a force to bend the yarns 11*a* is not exerted from the outside is L1. To a supporting member (not shown) disposed at a predetermined position in the image forming apparatus 100, the base fabric 11*b* is fixed by a fixing unit such as a double-coated tape to fix the brush 10. The brush 10 is fixed such that a shortest distance L2 from the base fabric 11*b* of the brush 10 fixed to the supporting member to the surface of the photosensitive drum 1 is shorter than the length L1 of the yarn 11*a* in the stand-alone state. A clearance between the supporting member and the photosensitive drum 1 is fixed. A difference between L2 and L1 is referred to as a penetration level of the brush 10 into the photosensitive drum 1. Since L2<L1 is satisfied, in a state where the brush 10 is in use, i.e., in a state where the brush 10 is fixed to the image forming apparatus 100 and in contact with the surface of the photosensitive drum 1, the tips of the yarns 11*a* are bent toward the rotation direction of the photosensitive drum 1, as illustrated in FIG. 3B. A contact portion between the tip of the yarn 11*a* provided on a most upstream side among the yarns 11*a* in the bent state and the surface of the photosensitive drum 1 is an upstream end of the contact region. A contact portion between the tip of the yarn 11*a* provided on a most downstream side among the yarns 11*a* in the bent state and the surface of the photosensitive drum 1 is a downstream end of the contact region. A form of contact between the brush 10 and the surface of the photosensitive drum 1 is contact between each of the plurality of yarns 11*a* and the surface of the photosensitive drum 1 and, even though the "contact region" is referred to as such, when viewed microscopically, the surface of the photosensitive drum 1 and the brush 10 are not in contact with each other in areas between the adjacent yarns 11*a*. The surface of the photosensitive drum 1 in the contact region and the brush 10 in contact with the surface of the photosensitive drum 1 form the contact portion.

A dimension of the brush 10 in the longitudinal direction (direction parallel to the rotation axis of the photosensitive drum 1) thereof is set such that the brush 10 comes into contact with an entire area of an image formation region (region where the toner image may be formed) on the photosensitive drum 1 in the direction of the rotation axis of the photosensitive drum 1. Meanwhile, a dimension of the brush 10 in a lateral direction (peripheral direction of the photosensitive drum 1 or direction parallel to the rotation direction) thereof is set appropriately on the basis of lifetimes of the image forming apparatus and a process cartridge.

The brush 10 is fixed to a given position with respect to the photosensitive drum 1 and slidably rubs the surface of the photosensitive drum 1 with the movement (rotation) of the photosensitive drum 1. The brush 10 collects (recovers) from the photosensitive drum 1 a deposit such as paper dust transferred from the recording material S onto the photosensitive drum 1 in the transfer portion to reduce an amount of the paper dust that moves to the charging portion and the developing portion on a side downstream of the brush 10 in the movement direction (rotation direction) of the photosensitive drum 1.

In the first embodiment, the length L1 of the yarn 11*a* of the brush 10 in the natural state is 4.8 mm, the penetration level of the brush 10 into the photosensitive drum 1 is 1.5 mm, a length L3 of the brush 10 in the lateral direction thereof is 5 mm, and the length thereof in the longitudinal thereof is 216 mm. A fineness (thickness) of the yarns 11*a* is 2 denier (representing a thickness of a yarn weighing 2 g per each 9000 m), and a density thereof is 240 kF/inch$^2$ (kF/inch$^2$ is a unit of the density of a brush and represents the number of filaments per square inch). Note that the length of the brush 10 in the lateral direction thereof is exemplary, and is not limited thereto. As the length of the brush 10 in the lateral direction thereof is larger, the paper dust can be collected over a longer period. The length of the brush 10 in the longitudinal direction thereof is exemplary, and is not limited thereto. For example, the length of the brush 10 in the longitudinal direction can be set on the basis of a maximum passable sheet width in the image forming apparatus 100. In addition, the fineness of the yarns 11*a* of the brush 10 is exemplary, and is not limited thereto. The fineness of the yarns 11*a* can be determined in consideration of a slip-through property of the paper dust. When the fineness of the brush 10 is excessively small, a force to dam the paper dust is weak to allow the paper dust to easily slip through the brush 10. When the paper dust has slipped through the brush 10, the photosensitive drum 1 is inhibited from being charged by the charging roller 2, which may cause an image defect. Meanwhile, when the fineness of the yarns 11*a* of the brush 10 is excessively large, the toner and fine paper dust cannot be collected to result in an uneven amount of the adhering toner in the longitudinal direction of the charging roller 2, and an uneven image density and defective charging of a paper dust adhesion portion may cause an image defect. The density of the yarns 11*a* of the brush 10 is exemplary, and is not limited thereto. The density of the yarns 11*a* can be set in consideration of a passability of the toner and a paper dust collectivity. When the density of the yarns 11*a* of the brush 10 is excessively large, the passability of the toner is low, the toner gets stuck, and the stuck toner is scattered, which may cause contamination in the apparatus. Meanwhile, when the density of the yarns 11*a* of the brush 10 is excessively small, sufficient paper dust collection performance may not be able to be obtained. From the viewpoint of the paper dust collection performance, the fineness and density of the yarns 11*a* are preferably 1 to 6 deniers and 150 to 350 kF/inch$^2$, respectively. From the viewpoint of responding to the longer lifetimes, the length L3 of the brush 10 in the lateral direction thereof is preferably equal to or more than 3 mm.

To the brush 10, a brush power source E4 (see FIG. 2) serving as a brush voltage applying unit is connected. During image formation, to the brush 10, a negative-polarity dc voltage is applied as a brush voltage from the brush power source E4. In the first embodiment, the brush voltage during the image formation is −400 V.

3. Image Outputting Operation

The image forming apparatus 100 performs a sequential operation of forming an image on the one or plurality of recording materials S in response to an instruction to start an image outputting operation (job) from the external device (not shown) such as a personal computer. In general, the job includes a pre-rotation step, an image forming step (printing step), a sheet interval step when the image is formed on each of the plurality of recording materials S, and a post-rotation step. The image forming step is a step of performing formation of an electrostatic image onto the photosensitive drum 1, development of the electrostatic image (formation of a toner image), transfer of the toner image, fixation of the toner image, and the like, while an image formation period refers to a period during which the image forming step is performed. During the image formation period, i.e., within the period during which the image forming step is performed, the individual operations such as the formation of the electrostatic image, the formation of the toner image, the transfer of the toner image, and the fixation of the toner image are performed at different timings. The pre-rotation step is a step of performing a preparatory operation prior to the image forming step. The sheet interval step is a step performed between the image forming step with respect to the first recording material S and the image forming step with respect to the second recording material S subsequent to the first recording material S when the image forming steps are continuously performed on the plurality of recording materials S (during continuous image formation). The post-rotation step is a step of performing a cleanup operation (preparatory operation) after the image forming step. A non-image formation period is a period other than the image formation period, and includes a pre-rotation step, a sheet interval step, and a post-rotation step. A pre-multi-rotation step corresponding to a preparatory operation when the image forming apparatus 100 is turned on or returns from a sleep state is also included in the non-image formation period.

4. Configuration of Reference Examples

Figure 4A:
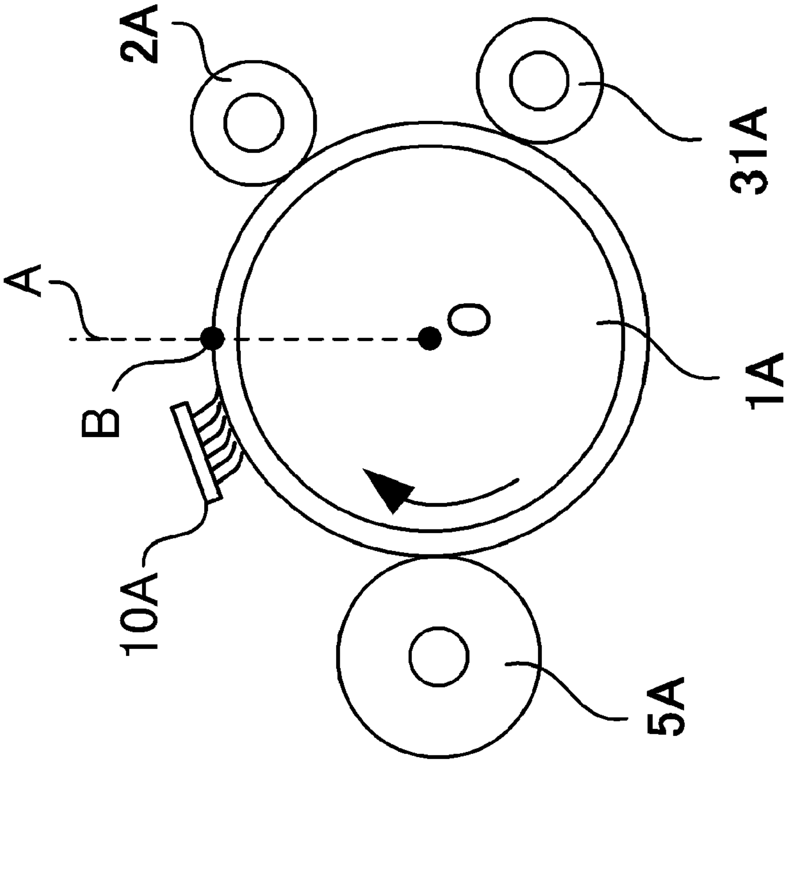
FIGS. 4A and 4B are cross-sectional views illustrating first and second reference examples.
Figure 4B:
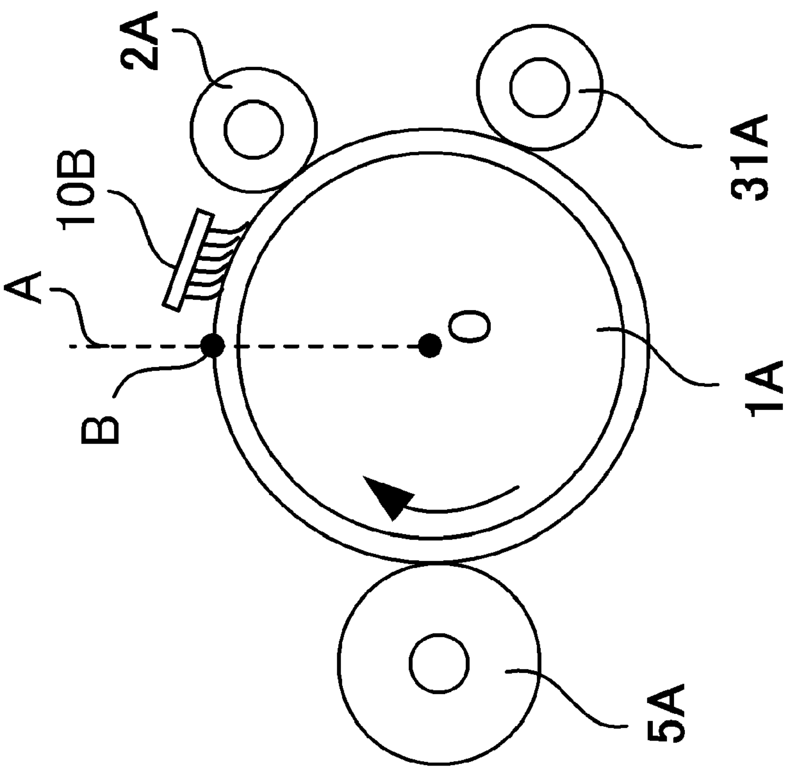

Next, a configuration in the first embodiment will be described in comparison to configurations in reference examples. FIGS. 4A and 4B are diagrams for illustrating the reference examples.

The reference examples will be described by using the two configurations. Hereinbelow, a description will be given of the first reference example by using FIG. 4A, while a description will be given of the second reference example by using FIG. 4B. FIGS. 4A and 4B are schematic cross-sectional views illustrating layouts of individual members around photosensitive drums in cross sections perpendicular to rotation axes of photosensitive drums in image forming apparatuses in the first and second reference examples. Hereinbelow, members related to the reference examples are denoted by reference signs different from those in the first embodiment to be discriminated from those in the first embodiment.

A photosensitive drum 1A in each of the reference examples is driven to rotate clockwise when viewed in a direction of the rotation axis around the rotation axis. In addition, in a peripheral direction of the photosensitive drum 1A, a transfer roller 5A, a brush 10A, a charging roller 2A, and a developing roller 31A are disposed. In each of FIGS. 4A and 4B, a point O represents a rotation axis of the photosensitive drum 1A. A broken line A in each of FIGS. 4A and 4B represents, in a cross section perpendicular to the rotation axis of the photosensitive drum 1A, a virtual line containing the rotation axis of the photosensitive drum 1A and extending upward from the rotation axis in a vertical direction. A point B in each of FIGS. 4A and 4B represents an intersection point between the virtual line and a surface of the photosensitive drum 1A.

In the first reference example, as illustrated in FIG. 4A, a contact region of the surface of the photosensitive drum 1A with the brush 10A is located on a transfer roller 5A side of the intersection point B (on a side upstream of the intersection point B in a rotation direction of the photosensitive drum 1A). Meanwhile, in the second reference example, as illustrated in FIG. 4B, the contact region of the surface of the photosensitive drum 1A with the brush 10A is located on a charging roller 2A side of the intersection point B (on a side downstream of the intersection point B in the rotation direction of the photosensitive drum 1A).

5. Configuration in First Embodiment

Figure 5:
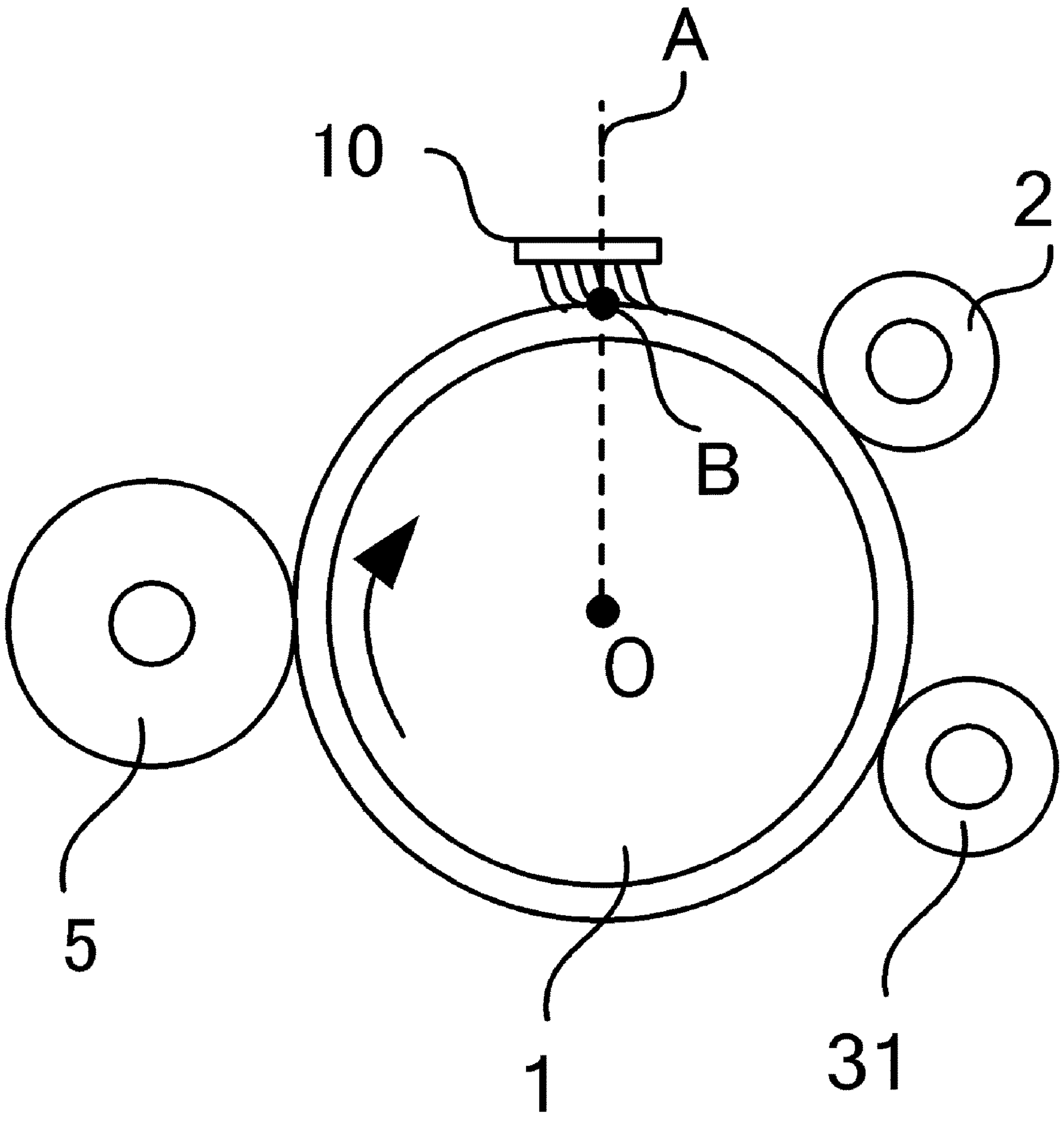
FIG. 5 is a cross-sectional view illustrating the first embodiment.

Next, referring to FIG. 5, a description will be given of the configuration in the first embodiment. FIG. 5 illustrates a cross section perpendicular to the rotation axis of the photosensitive drum 1 in the image forming apparatus 100 in the first embodiment, which illustrates a layout of the individual members around the photosensitive drum 1. The photosensitive drum 1 is driven to rotate clockwise when viewed in the direction of the rotation axis. Around the photosensitive drum 1, the transfer roller 5, the brush 10, the charging roller 2, and the developing roller 31 are disposed. Definitions of the broken line A and the intersection point B are the same as those for FIGS. 4A and 4B. In the first embodiment, as illustrated in FIG. 5, the intersection point B lies within the contact region of the surface of the photosensitive drum 1 with the brush 10. In addition, the intersection point B is located at a middle portion of the contact region in the rotation direction of the photosensitive drum 1. The brush 10 in the first embodiment is disposed such that, in a cross section perpendicular to the rotation axis of the photosensitive drum 1, the contact region of the surface of the photosensitive drum 1 in contact with the brush 10 overlaps a virtual line containing the rotation axis of the photosensitive drum 1 and extending upward from the rotation axis in the vertical direction. Note that the positional relationship between the contact region and the intersection point B involves a case where an upstream end or a downstream end of the contact region in the rotation direction of the photosensitive drum 1 contains the intersection point B.

6. Effect of First Embodiment

Next, to describe an effect occurring in the configuration in the first embodiment, a description will be given of problems in the reference examples.

Figure 6B:
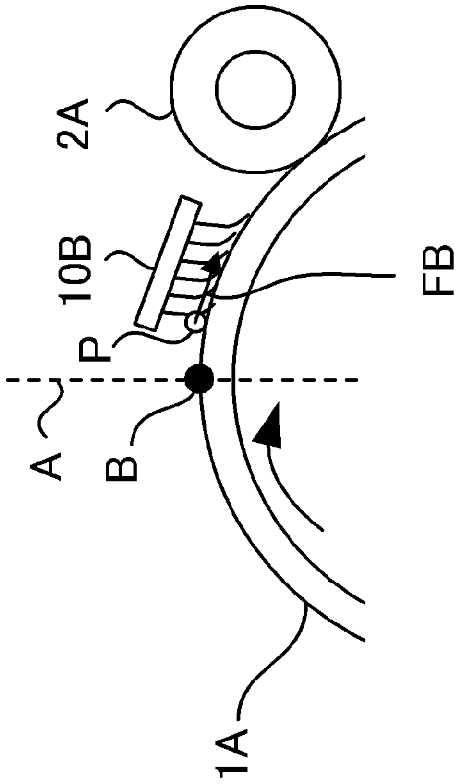
FIGS. 6A and 6B are cross-sectional views illustrating problems in the first and second reference examples.
Figure 6A:
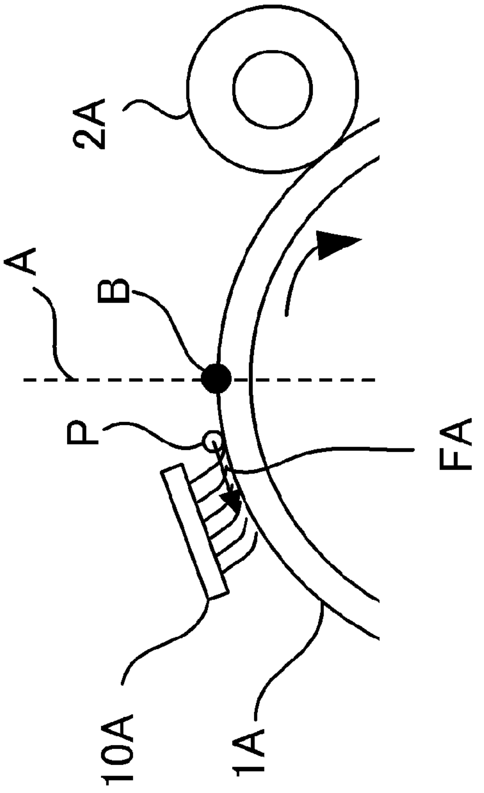

FIG. 6A is a diagram for illustrating the problem in the first reference example. When an image forming operation (job) in the image forming apparatus is performed to start transportation of the recording material S, during a transfer step, a part of paper dust on the recording material S is transferred onto the photosensitive drum 1A. Then, the paper dust transferred onto the photosensitive drum 1A is collected by the brush 10A.

A majority of the paper dust collected by the brush 10A is dammed by the upstream end of the contact region, but some small paper dust is not dammed by the upstream end of the contact region and moves gradually with rotation of the photosensitive drum 1A in the contact region to a downstream side in the rotation direction to reach the vicinity of the downstream end of the contact region.

A part of paper dust P that has reached the vicinity of the downstream end of the contact region moves with the rotation of the photosensitive drum 1A directly to a side downstream of the contact region. Meanwhile, since the downstream end of the contact region is on the transfer roller 5A side of the intersection point B, as illustrated in FIG. 6A, a part of the paper dust P that has reached the vicinity of the downstream end of the contact region receives a force FA having a vertically downward component due to gravity. As a result, a part of the paper dust P that has reached the vicinity of the downstream end of the contact region stays in the vicinity of the downstream end of the contact region.

When the image forming operation is repeatedly performed and more sheets of the recording material S are passed, the paper dust P staying in the vicinity of the downstream end of the contact region increases, and the staying paper dust stick to each other to form paper dust clumps. Then, during the rotation of the photosensitive drum 1A, for some reason such as a drum potential change, these paper dust clumps may move away from the vicinity of the downstream end of the contact region to the side downstream of the contact region. When these paper dust clumps pass through a charging portion, portions of the surface of the photosensitive drum 1A on which the paper dust clumps are present are not excellently charged to reach potentials higher than the voltage of the developing roller 31A, and the toner on the developing roller 31A may move in the developing portion to form images as black spots.

FIG. 6B is a diagram for illustrating the problem in the second reference example. In the second reference example also, in the same manner as in the first reference example, paper dust transferred onto the photosensitive drum 1A in the transfer step is dammed by the upstream end of the contact region. When the image forming operation is repeatedly performed, and the more sheets of the recording material S are further passed, paper dust clumps are formed on the upstream end of the contact region.

In the second reference example, the upstream end of the contact region is on the charging roller 2A side of the intersection point B, and consequently the dammed paper dust P receives not only a force resulting from the rotation of the photosensitive drum 1A, but also a force FB having a vertically downward component due to gravity, as illustrated in FIG. 6B. As a result, some of the paper dust clumps formed on the upstream end of the contact region may be gradually inserted into the brush 10B in a downstream direction to slip through the downstream end of the contact region. These paper dust clumps that have passed through the contact region may form black spots, in the same manner as in the first reference example.

In view of such problems in the first and second reference examples as described above, a description will be given of the effect of the first embodiment. In the first embodiment, in the cross section of the photosensitive drum 1, the intersection point B lies within the contact region of the surface of the photosensitive drum 1 in contact with the brush 10, and the intersection point B is located at the middle portion of the contact region in the rotation direction of the photosensitive drum 1. In other words, the downstream end of the contact region is located on the charging roller 2 side of the intersection point B (on the side downstream of the intersection point B in the rotation direction of the photosensitive drum 1). Consequently, unlike in the first reference example, a gravity-derived force acting on the paper dust that has reached the downstream end of the contact region does not act in a direction (direction toward an upstream side in the rotation direction) that causes the paper dust to stay on the downstream end of the contact region, but acts in a direction away from the downstream end of the contact region. This suppresses such formation of paper dust clumps in the vicinity of the downstream end of the contact region as described in the first reference example.

In addition, the upstream end of the contact region is located on a transfer roller 5 side of the intersection point B (side upstream of the intersection point B in the rotation direction of the photosensitive drum 1). Consequently, even when paper dust clumps are formed on the upstream end of the contact region, the gravity-derived force acting on the paper dust clumps does not act in a direction (direction toward the downstream side in the rotation direction) that inserts the paper dust clumps into the contact region and moves the paper dust clumps in the downstream direction, unlike in the second reference example. The gravity-derived force acting on the paper dust clumps acts in a direction away from the upstream end of the contact region. As a result, even when the paper dust clumps are formed, the paper dust clumps are inhibited from passing through the contact region and moving to the side downstream of the contact region.

Due to the effect of the first embodiment described above, it is possible to inhibit the formation of the black spots resulting from the paper dust clumps presenting the problems in the first and second reference examples.

Next, a description will be given of a sheet passing test performed to verify the effect of the first embodiment. The sheet passing experiment was performed under the following conditions. Under an environment (low-temperature/low-humidity environment) in which a temperature was 15° C. and a relative humidity was 10%, using Century Star paper (manufactured by CENTURY PULP AND PAPER incorporated, a trade name) as the recording material S, white images were continuously printed on 1000 sheets. The 100 sheets including and subsequent to the 901st sheet were extracted as samples, and the numbers of black spots appearing on the samples were counted. At this time, only highly visually recognizable black spots larger than 1.2 mm were counted. In the configurations in the first and second reference examples and the first embodiment, the sheet passing test was performed, and a result of comparing the numbers of the black spots is shown in Table 1.

TABLE 1

| | NUMBER OF BLACK SPOTS >1.2 mm |
|---|---|
| FIRST REFERENCE EXAMPLE | 8 |
| SECOND REFERENCE EXAMPLE | 13 |
| FIRST EMBODIMENT | 0 |

According to the result in Table 1, a large number of the black spots larger than 1.2 mm were recognized in each of the first and second reference examples, but no black spot was formed in the first embodiment.

Thus, with the configuration in the first embodiment, in the image forming apparatus 100 having the brush 10 to be brought into contact with the photosensitive drum 1, it was possible to inhibit a deposit accumulated on the brush 10 from being formed into clumps, coming off the brush 10, and causing an image defect.

Second Embodiment

A description will be given of a second embodiment of the present invention. A basic configuration and an operation of an image forming apparatus in the second embodiment are the same as those of the image forming apparatus in the first embodiment. Therefore, in the image forming apparatus in the second embodiment, a detailed description of components having functions or configurations which are the same as or correspond to those of the components of the image forming apparatus in the first embodiment will be omitted by using the same reference signs as those used in the image forming apparatus in the first embodiment.

1. Configuration in Second Embodiment

Figure 7:
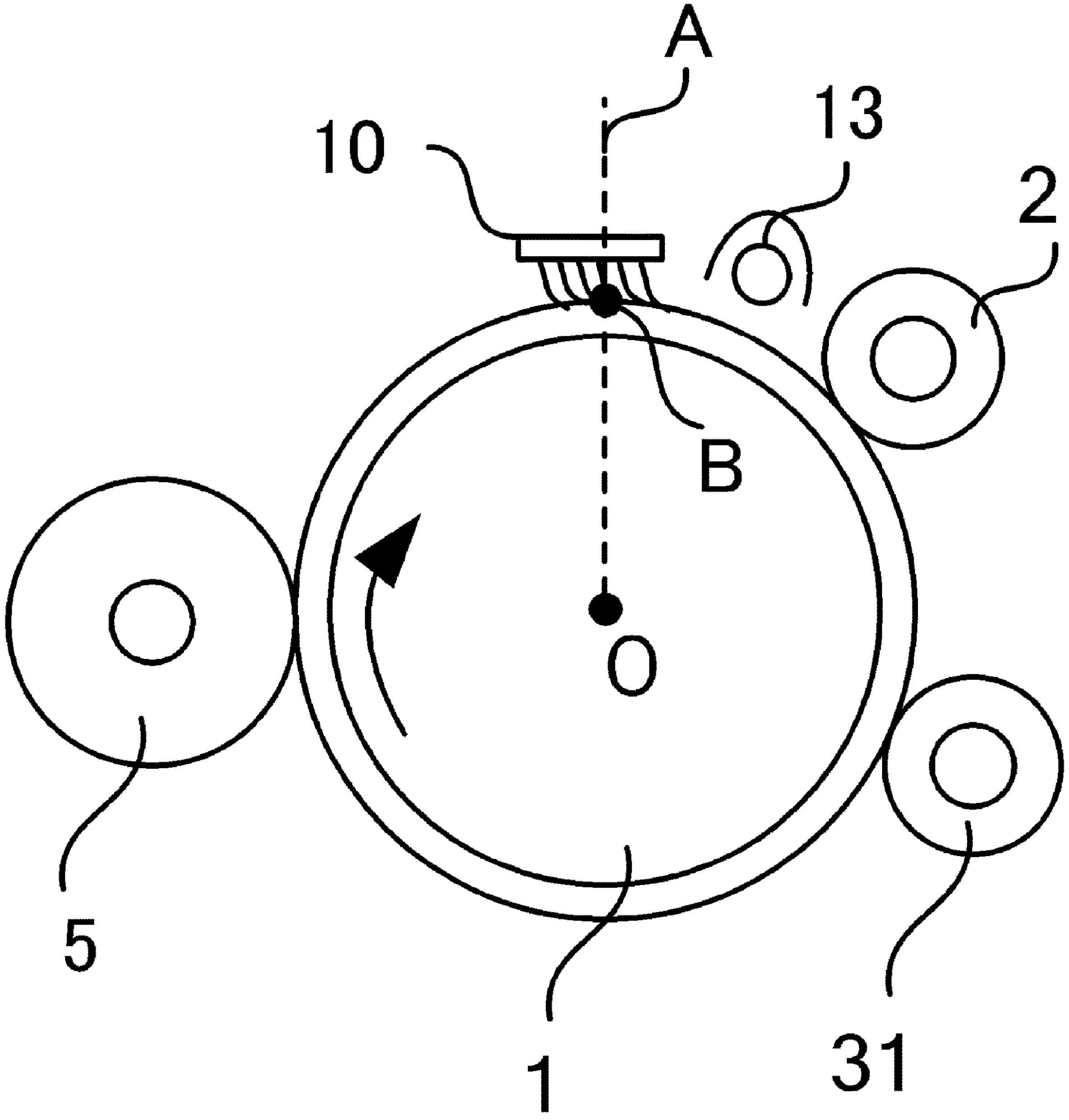
FIG. 7 is a cross-sectional view illustrating a second embodiment.

Referring to FIG. 7, a description will be given of arrangement of a brush in the second embodiment. FIG. 7 is a schematic cross-sectional view for illustrating a layout of individual members around the photosensitive drum 1 in a cross section perpendicular to the rotation axis of the photosensitive drum 1 in the image forming apparatus 100 in the second embodiment.

In the second embodiment, in the same manner as in the first embodiment, the photosensitive drum 1 is driven to rotate in the clockwise direction when viewed in the direction parallel to the rotation axis of the photosensitive drum 1. Around the photosensitive drum 1, the transfer roller 5, the brush 10, the charging roller 2, and the developing roller 31 are disposed. The second embodiment is characterized in that, between the brush 10 and the charging roller 2 in the rotation direction of the photosensitive drum 1, a pre-exposing device 13 is further provided.

The pre-exposing device 13 operates LEDs attached to a main body side surface not shown to emit light in parallel to a main scanning direction for the photosensitive drum 1. As a light guiding member for inhibiting uneven irradiation in the main scanning direction, a light guide or the like is used.

2. Effect of Second Embodiment

Next, to describe an effect generated in a configuration in the second embodiment, a description will be given of a difference from the first embodiment. In the configuration in the first embodiment, when paper dust is deposited in the vicinity of the upstream end of the contact region of the surface of the photosensitive drum 1 with the brush 10 to form paper dust clumps, a gravity-derived force acting on the paper dust clumps acts in the direction away from the upstream end of the contact region. As a result, even when the paper dust clumps are formed on the upstream end of the contact region, it is possible to inhibit the paper dust clumps from passing through the contact region and moving toward the charging roller 2. Meanwhile, in the case of paper dust that is not formed into clumps, the action of the gravity-derived force is small, and consequently the paper dust may possibly move from the upstream end of the contact region in the rotation direction of the photosensitive drum 1 and pass through the contact region. Even when the minute paper dust that is not formed into clumps moves toward the charging roller 2, the paper dust does not immediately cause black spots. However, when the paper dust adheres onto the photosensitive drum 1 and continues to rotate, the toner may eventually fuse starting from the paper dust to possibly cause black spots at intervals corresponding to a rotation cycle of the photosensitive drum 1.

In contrast, in the second embodiment, the pre-exposing device 13 disposed between the brush 10 and the charging roller 2 in the rotation direction of the photosensitive drum 1 neutralizes the surface of the photosensitive drum 1 on the side downstream of the brush 10. Consequently, it is possible to cause uniform discharge during charging and stably charge the minute paper dust that has passed through the contact region to the negative polarity. As a result, it is possible to more reliably collect the paper dust in the developing portion and inhibit black spots from being formed starting from the paper dust at the intervals corresponding to the rotation cycle of the photosensitive drum 1.

Next, a description will be given of a sheet passing test performed to verify the effect of the second embodiment. The sheet passing test was performed under the following conditions. Under an environment in which a temperature was 23° C. and a relative humidity was 50%, using Century Star paper (manufactured by CENTURY PULP AND PAPER incorporated, a trade name) as the recording material S, white images were continuously printed on 10000 sheets. A full halftone image was printed on one out of every 2000 sheets, and the number of black spots or white spots appearing at intervals corresponding to the rotation cycle of the photosensitive drum 1 was counted. Here, the black spots and the white spots each equal to or larger than 0.5 mm were counted. In the configurations in the first and second embodiments, the sheet passing test described above was performed, and a result of comparing the numbers of the counted black spots and white spots to each other is shown in Table 2.

TABLE 2

| | NUMBER OF PASSED SHEETS | | | | |
|---|---|---|---|---|---|
| | 2000 SHEETS | 4000 SHEETS | 6000 SHEETS | 8000 SHEETS | 10000 SHEETS |
| FIRST EMBODIMENT | 1 | 1 | 2 | 3 | 3 |
| SECOND EMBODIMENT | 0 | 0 | 0 | 0 | 0 |

According to the result in Table 2, in the configuration in the first embodiment, with an increase in the number of the passed sheets, only small numbers of black spots and white spots were formed at the intervals corresponding to the rotation cycle of the photosensitive drum 1 while, in the configuration in the second embodiment, neither black spot nor white spot was formed due to the increased number of the passed sheets.

Thus, with the configuration in the second embodiment, in the image forming apparatus 100 having the brush 10 to be brought into contact with the photosensitive drum 1, it was possible to inhibit an image defect from occurring due to a deposit accumulated on the brush 10.

Third Embodiment

A description will be given of a third embodiment of the present invention. A basic configuration and an operation of an image forming apparatus in the third embodiment are the same as those of the image forming apparatus in the first embodiment. Therefore, in the image forming apparatus in the third embodiment, a detailed description of components having functions or configurations which are the same as or correspond to those of the components of the image forming apparatus in the first embodiment will be omitted by using the same reference signs as those used in the image forming apparatus in the first embodiment.

1. Configuration in Third Embodiment

Figure 8:
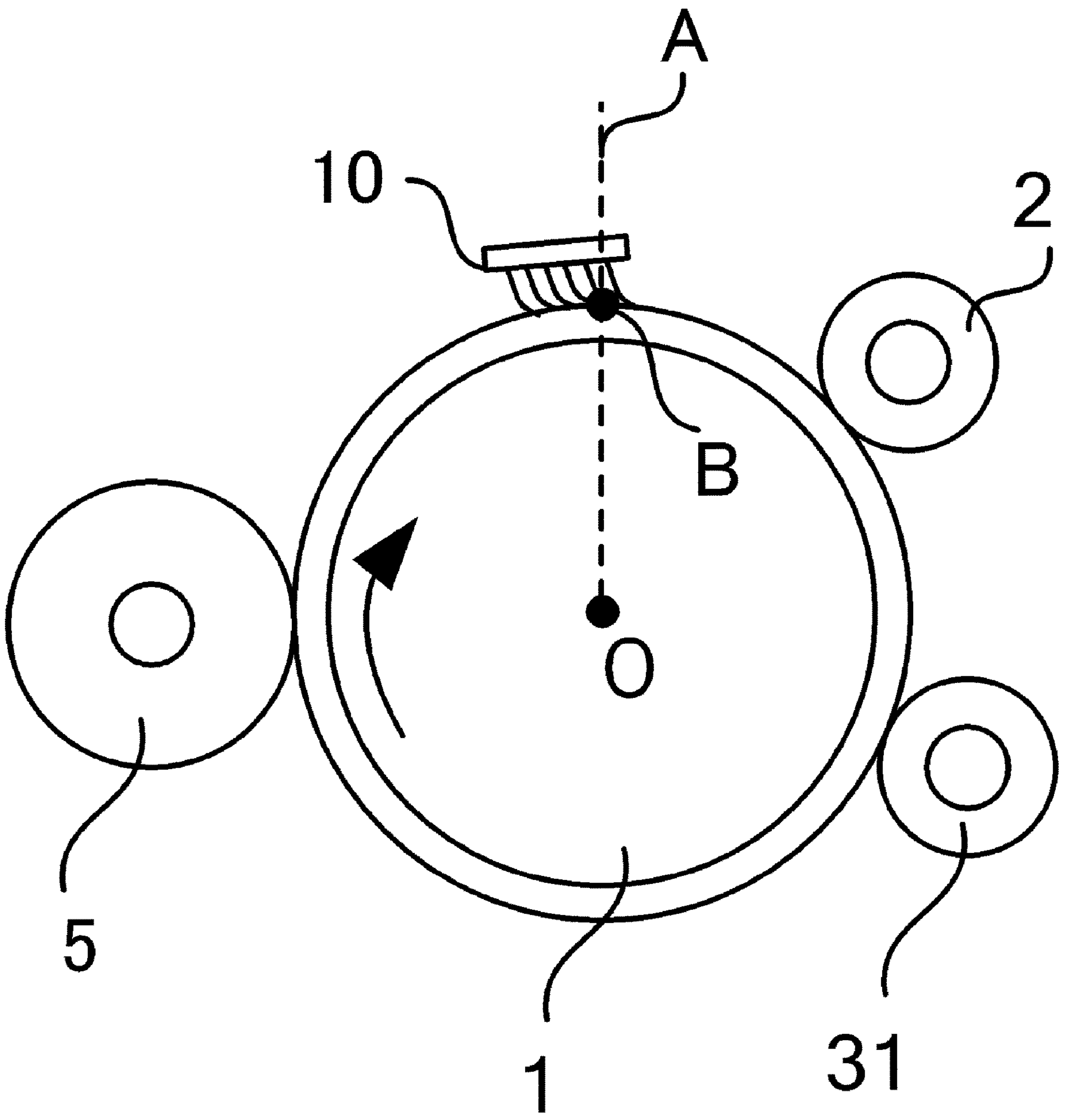
FIG. 8 is a cross-sectional view illustrating a third embodiment.

Referring to FIG. 8, a description will be given of arrangement of a brush in the third embodiment. FIG. 8 is a schematic cross-sectional view for illustrating a layout of individual members around the photosensitive drum 1 in a cross section perpendicular to the rotation axis of the photosensitive drum 1 in the image forming apparatus 100 in the third embodiment.

In the third embodiment, in the same manner as in the first embodiment, the photosensitive drum 1 is driven to rotate in a clockwise direction when viewed in the direction parallel to the rotation axis of the photosensitive drum 1. Around the photosensitive drum 1, the transfer roller 5, the brush 10, the charging roller 2, and the developing roller 31 are disposed.

As illustrated in FIG. 8, the brush 10 is disposed such that, in the cross section perpendicular to the rotation axis of the photosensitive drum 1, the contact region of the surface of the photosensitive drum 1 in contact with the brush 10 overlaps the virtual line containing the rotation axis of the photosensitive drum 1 and extending upward from the rotation axis in the vertical direction. In other words, the brush 10 is disposed such that the contact region contains the intersection point B. In addition, the intersection point B is located on the charging roller 2 side of the middle portion of the contact region in the rotation direction of the photosensitive drum 1 (downstream side in the rotation direction of the photosensitive drum 1). In other words, the middle portion of the contact region in the rotation direction of the photosensitive drum 1 is located on the transfer roller 5 side of the intersection point B (upstream side in the rotation direction of the photosensitive drum 1).

2. Effect of Third Embodiment

Next, a description will be given of an effect occurring in a configuration in the third embodiment. First, Table 3 shows a result of a sheet passing test in which, in each of the individual configurations in the first and second reference examples and the first embodiment, black spots each having a size of 1.2 mm and black spots each having a size of 0.8 mm to 1.2 mm were individually counted under the same sheet passing test conditions as those in the first embodiment.

TABLE 3

| | NUMBER OF BLACK SPOTS | |
|---|---|---|
| | >1.2 mm | 0.8-1.2 mm |
| FIRST REFERENCE EXAMPLE | 8 | 14 |
| SECOND REFERENCE EXAMPLE | 13 | 25 |
| FIRST EMBODIMENT | 0 | 8 |

From the result in Table 3, it was understood that, when consideration was given even to sizes smaller than 1.2 mm, the black spots were formed also in the first embodiment, though the number thereof was minimized. It will also be understood that, when the first and second reference examples are compared to each other, a larger number of the black spots of each size were formed in the second reference example. Accordingly, it can be considered that the formation of the black spots is significantly affected by the paper dust clumps accumulated on the upstream end of the contact region of the surface of the photosensitive drum 1A in contact with the brush 10A, which are the cause of the formation of the black spots in the second reference example.

In the configuration in the first embodiment, when paper dust clumps are formed on the upstream end of the contact region of the surface of the photosensitive drum 1 with the brush 10, the paper dust clumps are gradually inserted from the upstream end of the contact region into the contact region by the action of the rotation of the photosensitive drum 1 to move to a downstream side. The gravity-derived force acting on the paper dust clumps acts in the direction toward the upstream side in the rotation direction of the photosensitive drum 1, and the magnitude of the component of the force which is parallel to the surface of the photosensitive drum 1 decreases as the paper dust clumps are closer to the intersection point B. When the paper dust clumps have moved to positions on the charging roller 2 side of the intersection point B (side downstream of the intersection point B in the rotation direction of the photosensitive drum 1), the gravity-derived force acting on the paper dust clumps acts in the direction toward the downstream side in the rotation direction of the photosensitive drum 1. Consequently, the paper dust clumps beyond the intersection point B are more likely to pass through the contact region.

In the third embodiment, in the same manner as in the first embodiment, the intersection point B lies within the contact region of the surface of the photosensitive drum 1 in contact with the brush 10 but, as illustrated in FIG. 8, a size of an area extending from the upstream end of the contact region to the intersection point B is larger than in the first embodiment. In other words, a position of the upstream end of the contact region is closer to the transfer roller 5 in the rotation direction of the photosensitive drum 1 than in the first embodiment. Consequently, even when paper dust clumps are formed on the upstream end of the contact region, the gravity-derived force acting on the paper dust clumps more strongly acts in the direction toward the upstream side in the rotation direction of the photosensitive drum 1. As a result, even when paper dust clumps are formed, the paper dust clumps are inhibited from being inserted from the upstream end of the contact region to a downstream side in the contact region and passing through the contact region. In addition, in the same manner as in the first embodiment, the downstream end of the contact region is located on the charging roller 2 side of the intersection point B (downstream side in the rotation direction of the photosensitive drum 1), and accordingly the stay of the paper dust in the vicinity of the downstream end of the contact region, which is the cause of the formation of the black spots in the first reference example, is unlikely to occur.

Table 4 shows results of performing the sheet passing test under the same conditions as those in the first embodiment in each of the individual configurations in the first and third embodiments and counting black spots each having a size of 1.2 mm and black spots each having a size of 0.8 mm to 1.2 mm.

TABLE 4

| | NUMBER OF BLACK SPOTS | |
|---|---|---|
| | >1.2 mm | 0.8-1.2 mm |
| FIRST EMBODIMENT | 0 | 8 |
| THIRD EMBODIMENT | 0 | 2 |

As shown in Table 4, the black spots each having the size of 0.8 mm to 1.2 mm and formed in the third embodiment were reduced compared to those in the first embodiment.

Thus, with the configuration in the third embodiment, in the image forming apparatus 100 having the brush 10 to be brought into contact with the photosensitive drum 1, it was possible to inhibit a deposit accumulated on the brush 10 from being formed into clumps, coming off the brush 10, and causing an image defect.

Note that, in the configuration in the third embodiment, the same pre-exposing device as that in the second embodiment may also be disposed. This can reduce the black spots appearing at the intervals corresponding to the rotation cycle of the photosensitive drum 1.

Fourth Embodiment

A description will be given of a fourth embodiment of the present invention. A basic configuration and an operation of an image forming apparatus in the fourth embodiment are the same as those of the image forming apparatus in the third embodiment. Therefore, in the image forming apparatus in the fourth embodiment, a detailed description of components having functions or configurations which are the same as or correspond to those of the components of the image forming apparatus in the third embodiment will be omitted by using the same reference signs as those used in the image forming apparatus in the third embodiment.

1. Configuration in Fourth Embodiment

Figure 9:
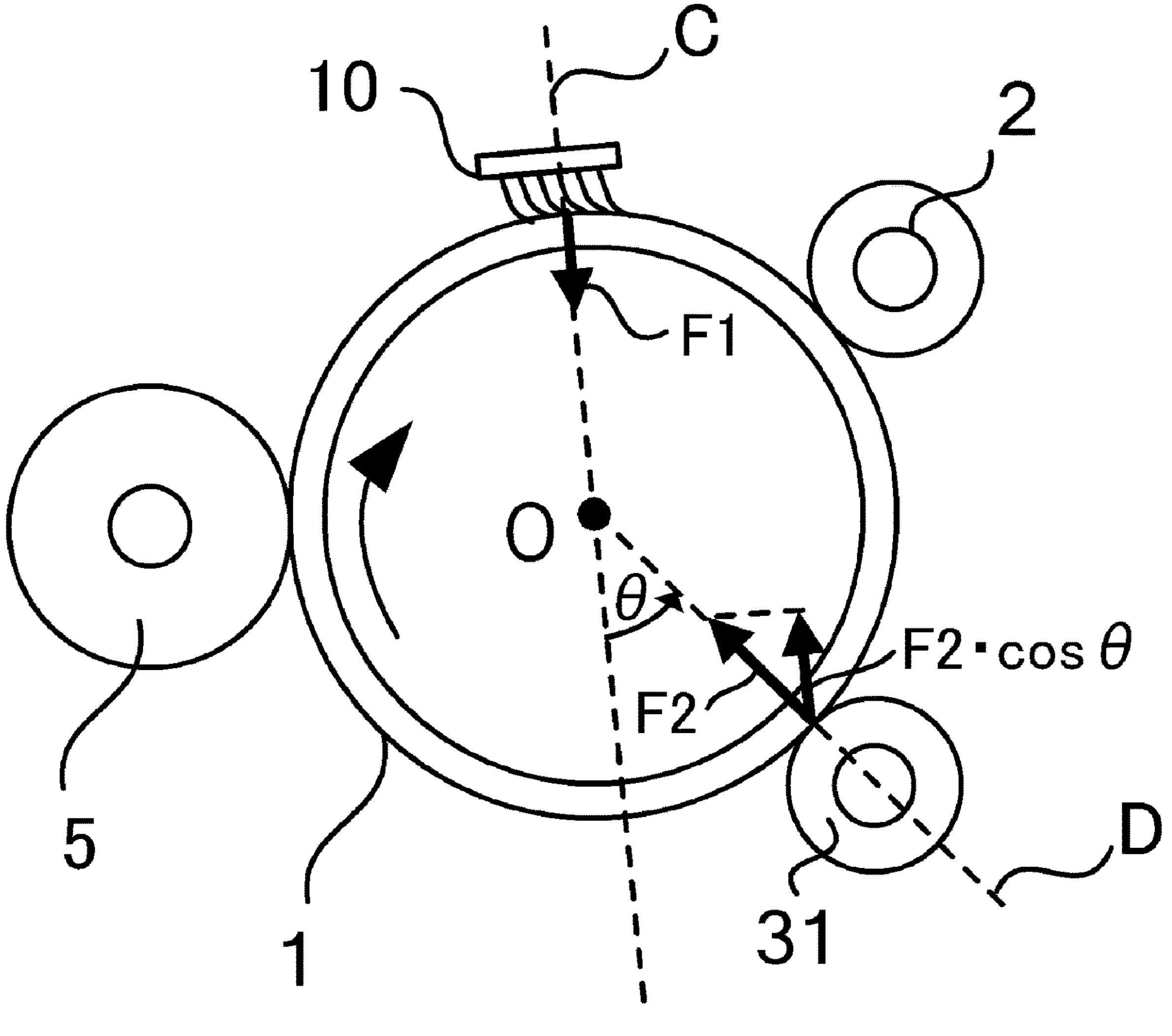
FIG. 9 is a cross-sectional view illustrating a fourth embodiment.

The fourth embodiment is different from the third embodiment in the layout of the brush 10 and the other members in the peripheral direction of the photosensitive drum 1. Examples of the other members include the developing roller 31. The following will describe a configuration in the fourth embodiment with reference to FIG. 9. FIG. 9 is a schematic cross-sectional view for illustrating relationships between the layout of the individual members around the photosensitive drum 1 and forces acting on the photosensitive drum 1 in a cross section perpendicular to the rotation axis of the photosensitive drum 1 in the image forming apparatus 100 in the fourth embodiment.

In the fourth embodiment, in the same manner as in the third embodiment, the photosensitive drum 1 is driven to rotate in the clockwise direction when viewed in the direction parallel to the rotation axis of the photosensitive drum 1. Around the photosensitive drum 1, the transfer roller 5, the brush 10, the charging roller 2, and the developing roller 31 are disposed. The brush 10 is disposed in the same manner as in the third embodiment.

It is assumed that a pressure exerted on the surface of the photosensitive drum 1 by the brush 10 is F1. It is assumed that a pressure exerted on the surface of the photosensitive drum 1 by the developing roller 31 serving as a contact member to be brought into contact with the surface of the photosensitive drum 1 other than the brush is F2. In the fourth embodiment, a magnitude of the pressure F1 is equal to or less than a magnitude of a component of the pressure F2 which is parallel to the pressure F1.

It is also assumed that, in a cross section of the photosensitive drum 1, a virtual line passing through each of the middle portion of the contact region of the surface of the photosensitive drum 1 in contact with the brush 10 in the rotation direction of the photosensitive drum 1 and the rotation axis O of the photosensitive drum 1 is C. In the fourth embodiment, the developing roller 31 serving as the contact member and the upstream-side end portion of the contact region are on opposite sides with respect to the virtual line C interposed therebetween.

More specifically, it is assumed that, in the cross section of the photosensitive drum 1, a virtual line passing through each of a contact portion of the surface of the photosensitive drum 1 with the developing roller 31 and the rotation axis O of the photosensitive drum 1 is D. It is assumed that an angle formed between the virtual line C and the virtual line D is θ. It is assumed that, in FIG. 9, a counterclockwise direction is a positive direction of an angle θ. It is assumed that the pressure under which the brush 10 comes into contact with the surface of the photosensitive drum 1 is F1 (force in the direction of the rotation axis O), and the pressure under which the developing roller 31 comes into contact with the surface of the photosensitive drum 1 is F2 (force in the direction of the rotation axis O). In the fourth embodiment, F1 and a component (F2·cos θ) of F2 which is in a direction parallel to the virtual line C satisfy F1≤F2·cos θ (θ≥0). For example, the contact pressure F1 of the brush 10 is 4.9 N, the contact pressure F2 of the developing roller 31 is 9.6 N, and the angle θ formed between the virtual line C and the virtual line D is an angle in a range given by 0°≤θ≤58.6°.

To measure the contact pressure F1 of the brush 10, a small table-top tester (EZ-S manufactured by Shimadzu Corporation) was used. Specifically, the brush was held between upper and lower pressure platens each having a diameter of Φ118, a repulsive force in a state where each of the platens penetrates the brush by 1.5 mm was measured, and a measurement value is converted according to a longitudinal length of the brush 10 used in the embodiment. Meanwhile, as the contact pressure F2 of the developing roller 31, a contact pressure at rest calculated on the basis of characteristics of a pressure spring not shown was used.

2. Effect of Fourth Embodiment

Next, a description will be given of an effect of the fourth embodiment. The brush 10 is in contact with the photosensitive drum 1, and the pressure F1 is exerted from the brush 10 on the photosensitive drum 1. When the photosensitive drum 1 is warped by the pressure F1, it can be considered that a gap is formed between the brush 10 and the surface of the photosensitive drum 1, and paper dust slips through the gap. Meanwhile, on the photosensitive drum 1, the pressure F2 exerted by the developing roller 31 acts, and the component F2·cos θ (>0) parallel to the virtual line C acts as a force that reduces the warping of the photosensitive drum 1 due to the pressure F1 of the brush 10. In the fourth embodiment, F1≤F2·cos θ is established, and consequently the photosensitive drum 1 is inhibited from warping to inhibit a gap from being formed between the brush 10 and the photosensitive drum 1. In the configuration in the fourth embodiment, when |θ|≤58.6° is satisfied, F1≤F2·cos θ is established.

As described in the third embodiment, as the cause of the formation of black spot images, a phenomenon in which the paper dust clumps staying on the upstream end of the contact region of the surface of the photosensitive drum 1 in contact with the brush 10 pass through the contact region as observed in the second reference example is greatly influential. Accordingly, to cause F2·cos θ to act more effectively on an upstream side of the contact region, it is preferable to dispose the developing roller 31 within a range represented by 0°≤θ≤58.6°.

By thus disposing the developing roller relative to the brush 10 in the peripheral direction of the photosensitive drum 1 as in the configuration in the fourth embodiment, paper dust collectivity at the upstream end of the contact region is stabilized and the formation of the black spots can be suppressed. Note that, in the fourth embodiment, the description has been given of the arrangement of the developing roller 31 but, by disposing the contact members to be brought into contact with the photosensitive drum 1, such as the charging roller 2 and the transfer roller 5, so as to suppress the warping of the photosensitive drum 1 due to the contact with the brush 10, the same effects can be obtained.

Fifth Embodiment

In the configuration in Japanese Patent Application Publication No. 2003-271030, when an image with a high print percentage is continuously printed on a large quantity of sheets, the untransferred toner is gradually accumulated on the brush and, when an allowable amount is exceeded, the toner is discharged from the brush, which may possibly cause an image defect.

An object of the fifth embodiment is to suppress, in an image forming apparatus having a brush to be brought into contact with a photosensitive drum, occurrence of an image defect due to a toner accumulated on the brush.

According to the fifth embodiment, it is possible to suppress, in the image forming apparatus having the brush to be brought into contact with the photosensitive drum, the occurrence of the image defect due to the toner accumulated on the brush.

1. Image Forming Apparatus

Figure 10:
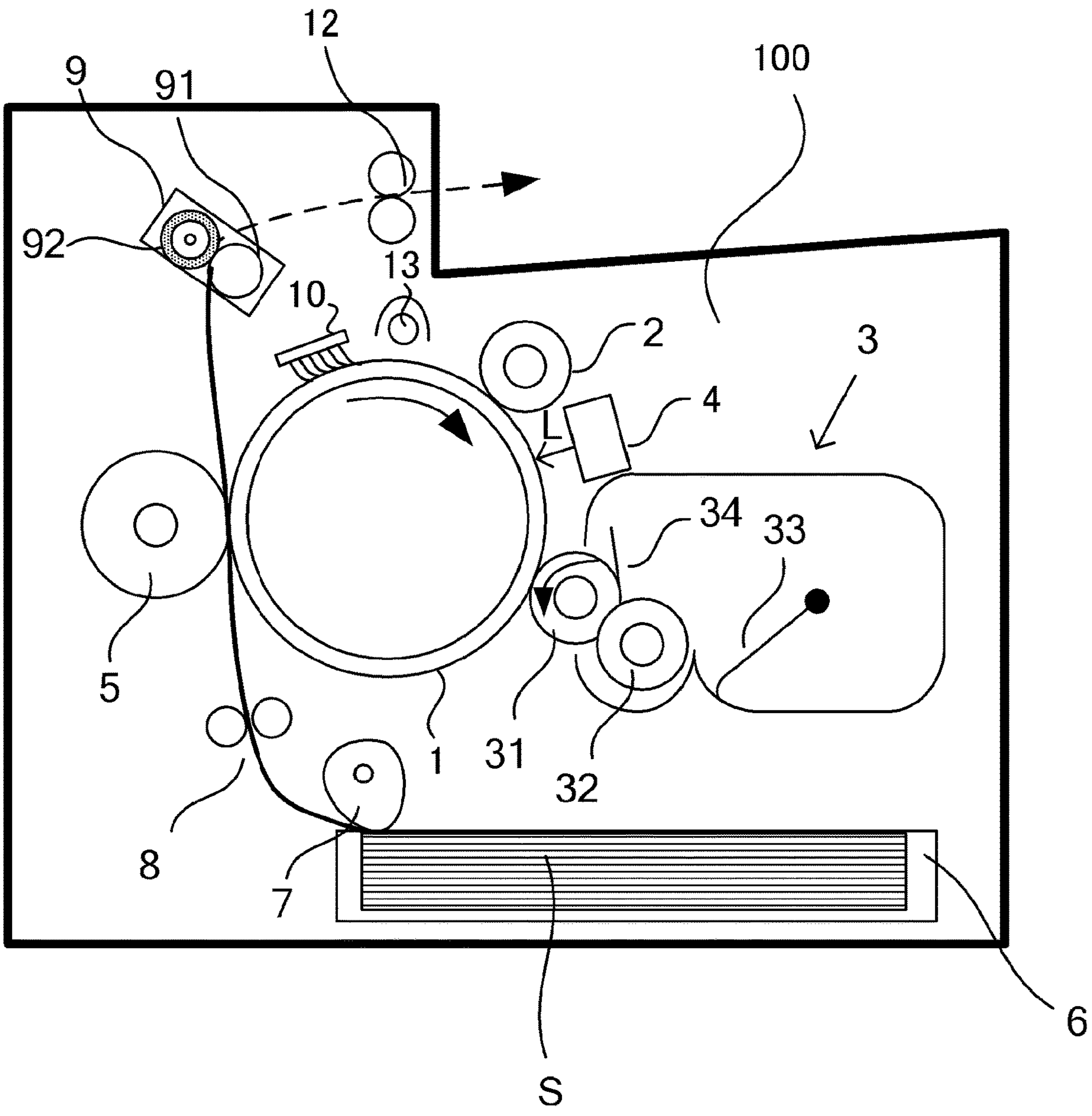
FIG. 10 is an illustrative view of an image forming apparatus in a fifth embodiment.

FIG. 10 illustrates a schematic configuration of an embodiment of the image forming apparatus 100 according to the present invention. The image forming apparatus 100 in the fifth embodiment has the same configuration as that of the image forming apparatus 100 in the first embodiment except for having the pre-exposing device 13 described later, and therefore a detailed description thereof is omitted.

2. Configuration of Brush

Figure 11:
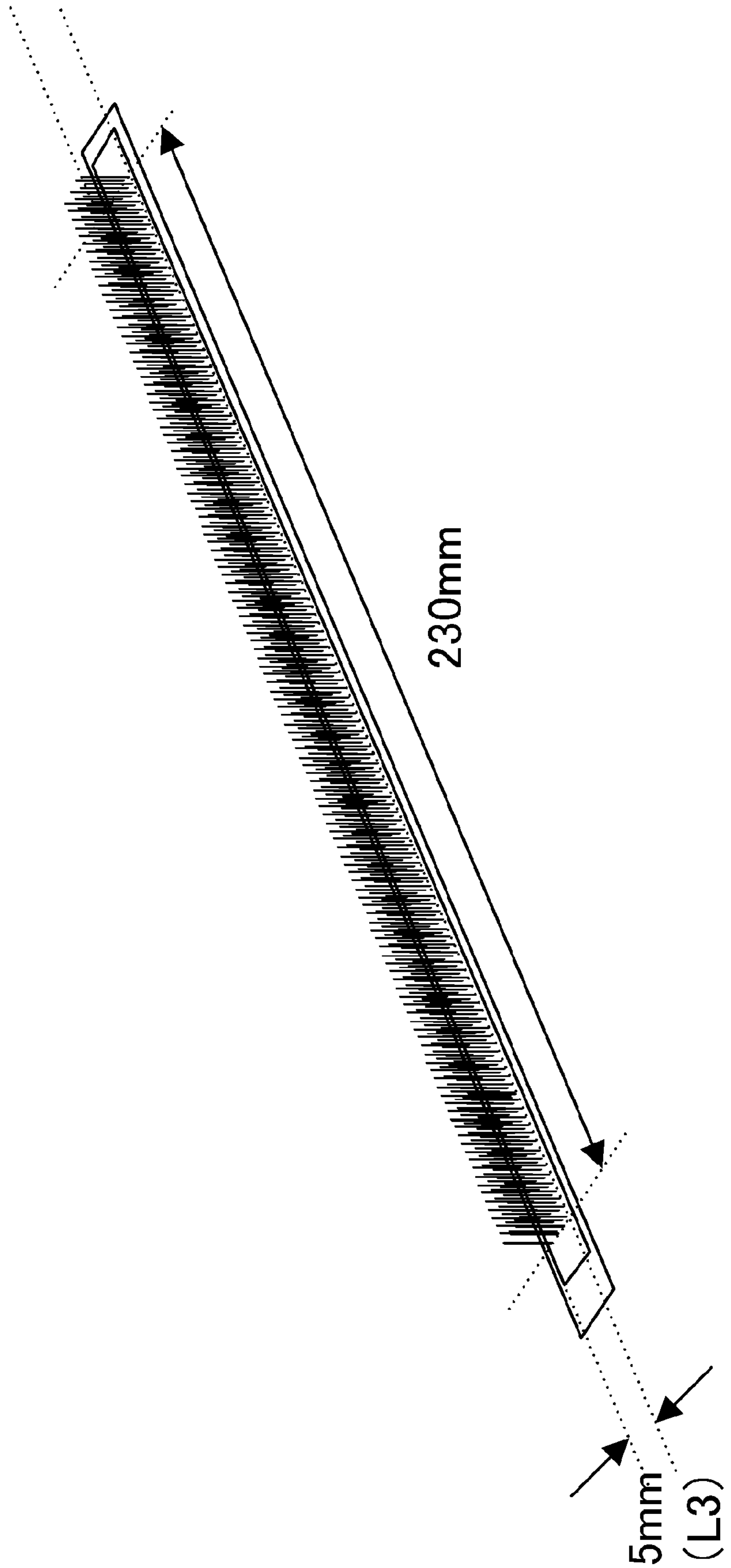
FIG. 11 is a perspective view of a brush in the fifth embodiment.

The image forming apparatus 100 has the brush 10 to be brought into contact with the surface of the photosensitive drum 1 in a brush portion. A description of components of the brush 10 in the fifth embodiment which are the same as those of the brush 10 described with reference to FIGS. 3A and 3B in the first embodiment is omitted. FIG. 11 is a perspective view of the brush 10 in the fifth embodiment.

In the fifth embodiment, the length L1 of each of the yarns 11*a* of the brush 10 in a natural state is 4.8 mm, a penetration level of the brush 10 into the photosensitive drum 1 is 1.5 mm, the length L3 of the brush 10 in the lateral direction is 5 mm, and the length thereof in the longitudinal direction is 230 mm. The fineness (thickness) of the yarns 11*a* is 2 denier (representing a thickness of a yarn weighing 2 g per each 9000 m), and a density thereof is 240 $kF/inch^2$ ($kF/inch^2$ is a unit of the density of a brush and represents the number of filaments per square inch). An arrangement of the yarns 11*a* is substantially uniform from roots thereof on the base fabric 11*b* to yarn tips thereof corresponding to the contact portion with the surface of the photosensitive drum 1.

To the brush 10, the brush power source E4 (see FIG. 2) serving as the brush voltage applying unit is connected. During the image formation, to the brush 10, the negative-polarity dc voltage is applied as the brush voltage from the brush power source E4. In the fifth embodiment, the brush voltage during the image formation is −300 V.

The image forming apparatus 100 is a cleaner-less system in which, after the developer image is transferred onto the recording material S serving as the transferred member, the developer (untransferred toner) remaining on the surface of the photosensitive drum 1 is collected by the developing device 3. The polarity of the untransferred toner is preferably the same as the regular polarity (which is the negative polarity in the fifth embodiment) of the toner. When it is assumed that the untransferred toner has the polarity (which is the positive polarity in the fifth embodiment) reverse to the regular polarity, due to a potential relationship between the bright potential Vl (−100 V) and the brush voltage (−300 V), the untransferred toner on the portion at the bright potential is electrostatically collected by the brush 10. Actually, the bright potential portion is affected by the transfer, and the potential is further controlled in a direction of having a smaller absolute value. Meanwhile, the positive-polarity untransferred toner not collected by the brush 10 adheres to the downstream charging roller 2, which may possibly cause an uneven density. When the untransferred toner has the regular polarity (negative polarity), the untransferred toner is unlikely to electrostatically adhere to the brush 10 and the charging roller 2, and can be collected in the developing portion. A description will be given below on the assumption that the polarity of the untransferred toner is the regular polarity (negative polarity).

3. Configuration or Pre-Exposing Device

Next, a description will be given of the pre-exposing device. As illustrated in FIG. 10, to even out the potential over the photosensitive drum 1 after a transfer step, the image forming apparatus 100 has the pre-exposing device 13. The pre-exposing device 13 is a pre-exposing unit that exposes the surface of the photosensitive drum 1 to light on a side downstream of the brush 10 and upstream of the charging portion in the rotation direction of the photosensitive drum 1. The pre-exposing device 13 operates the LEDs attached to the main body side surface not shown to emit light in parallel to the main scanning direction for the photosensitive drum 1. As the light guiding member for inhibiting uneven irradiation in the main scanning direction, the light guide or the like is used. To even out the potential over the photosensitive drum 1 after the transfer step with respect to the recording material S, the pre-exposing device 13 performs an exposing operation mainly during the image formation to reduce the surface potential of the photosensitive drum 1 to approximately 0 V.

4. Image Outputting Operation

An image outputting operation in the image forming apparatus 100 in the fifth embodiment is the same as the image outputting operation described in the first embodiment, and therefore a description thereof is omitted.

5. Configuration in Third Reference Example

Figure 12:
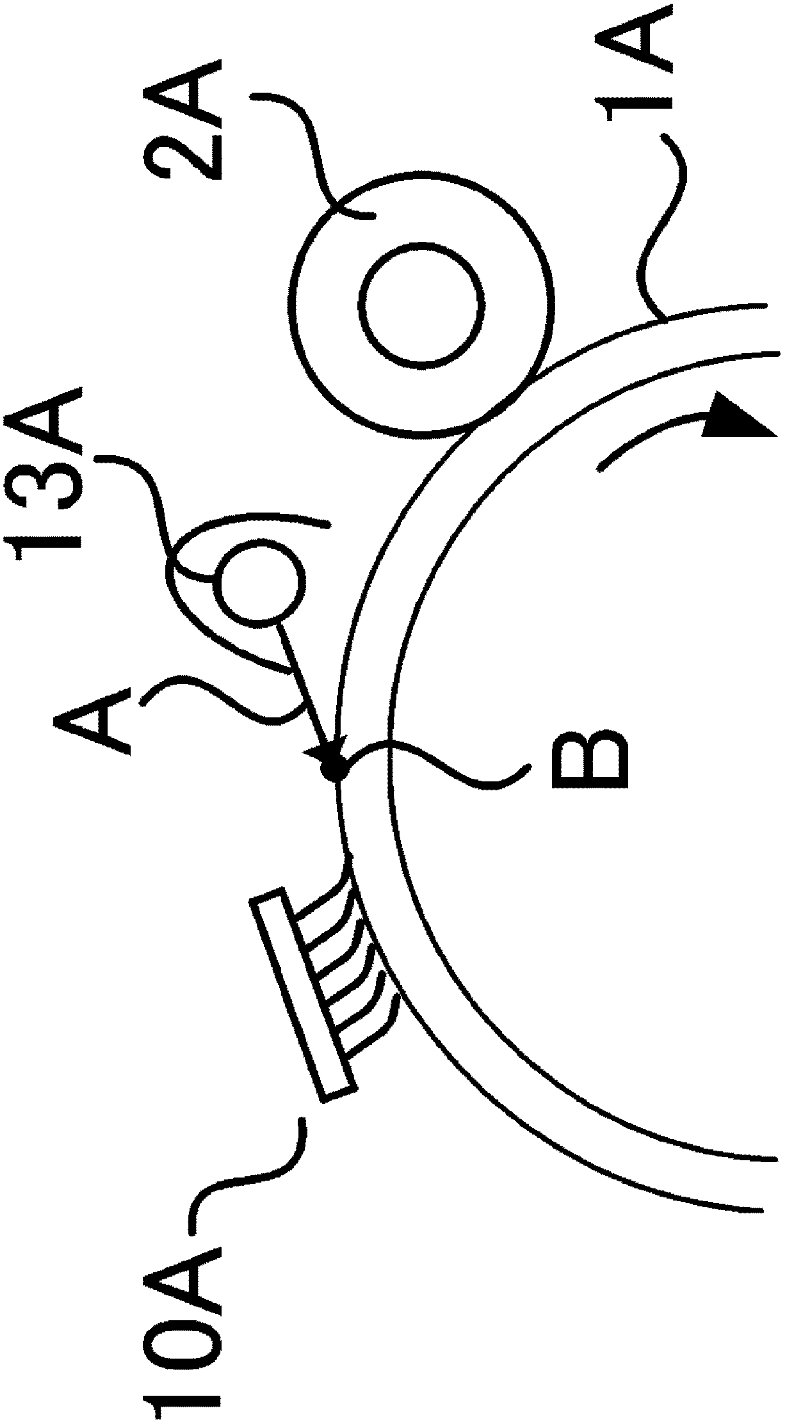
FIG. 12 is a cross-sectional view illustrating a third reference example.

For the convenience of the description of the fifth embodiment, a description will be given of a configuration in a third reference example. FIG. 12 is a diagram for illustrating the third reference example. Hereinbelow, members related to the third reference example are denoted by reference signs different from those in the fifth embodiment to be discriminated from those in the fifth embodiment. FIG. 12 is a cross-sectional view illustrating, in a cross section perpendicular to the rotation axis of the photosensitive drum 1A, a layout of individual members around the photosensitive drum 1A in an image forming apparatus in the third reference example. Of optical paths of light when a pre-exposing device 13A exposes the surface of the photosensitive drum 1A to light, the most-upstream-side optical path in the rotation direction of the photosensitive drum 1A is denoted by a mark A. In a cross section perpendicular to the rotation axis of the photosensitive drum 1A, a region of the surface of the photosensitive drum 1A on a side upstream of the intersection point B between the optical path A and the surface of the photosensitive drum 1A is an unexposed area where the exposure by the pre-exposing device 13A is not performed. In the third reference example, in the cross section perpendicular to the rotation axis of the photosensitive drum 1A, in the rotation direction of the photosensitive drum 1A, the intersection point B is located on a side downstream of a downstream end of the contact region of the surface of the photosensitive drum 1A in contact with the brush 10A in the rotation direction of the photosensitive drum 1A. Consequently, the contact region of the photosensitive drum 1A with the brush 10A and an exposed area where the exposure by the pre-exposing device 13A is performed do not have a common portion therebetween. In other words, the contact region and the exposed area do not overlap each other, and in the contact region, a portion contained in the exposed area does not exist.

6. Configuration in Fifth Embodiment

Figure 13:
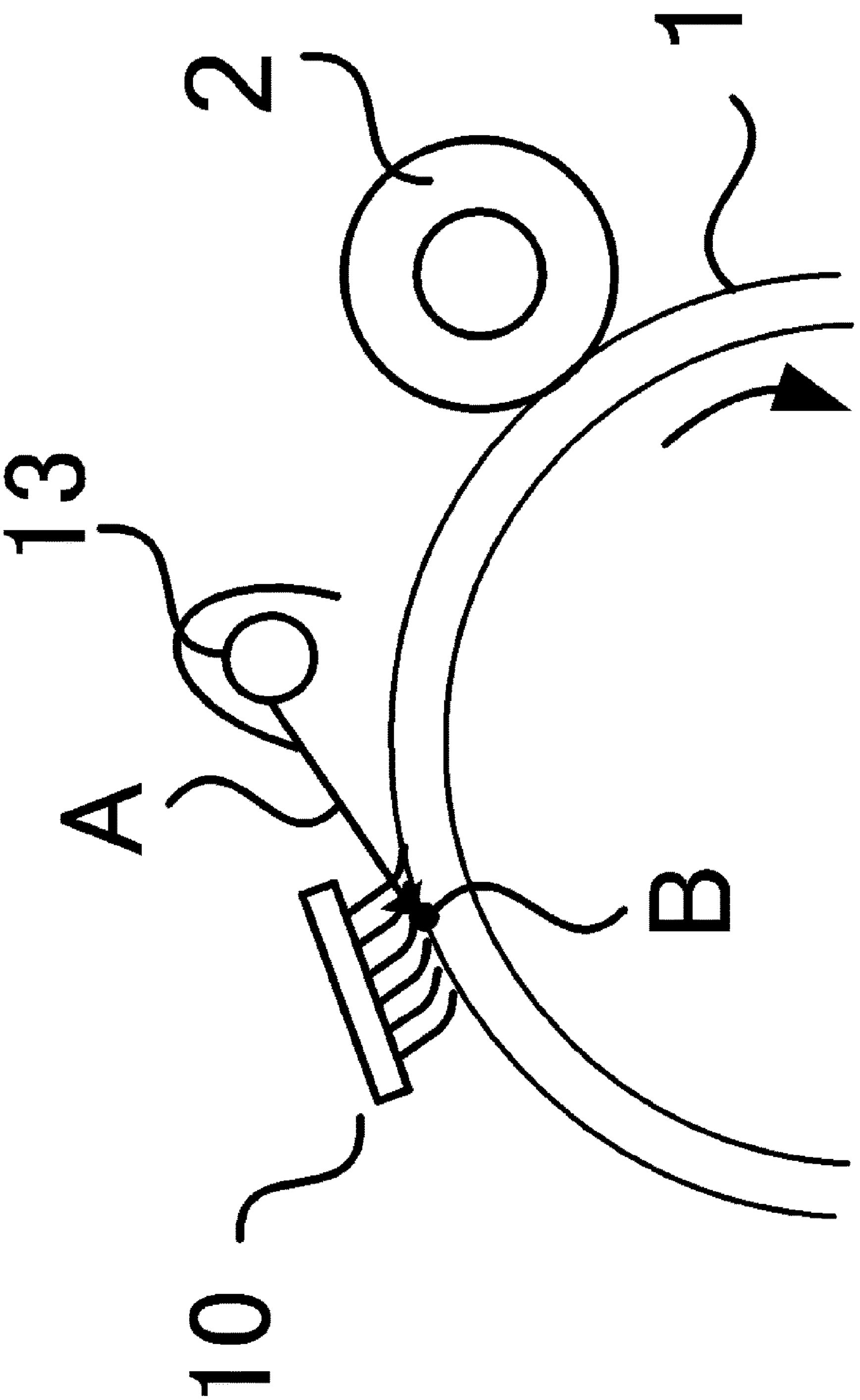
FIG. 13 is a cross-sectional view illustrating the fifth embodiment.

Referring to FIG. 13, a description will be given of a configuration in the fifth embodiment. FIG. 13 is a cross-sectional view illustrating the layout of the individual members around the photosensitive drum 1 in a cross section perpendicular to the rotation axis of the photosensitive drum 1 in the image forming apparatus in the fifth embodiment.

In FIG. 13, of optical paths of light when the pre-exposing device 13 exposes the surface of the photosensitive drum 1 to light, the most-upstream-side optical path in the rotation direction of the photosensitive drum 1 is denoted by the mark A. In a cross section perpendicular to the rotation axis of the photosensitive drum 1, a region of the surface of the photosensitive drum 1 on a side upstream of the intersection point B between the optical path A and the surface of the photosensitive drum 1 is an unexposed area where the exposure by the pre-exposing device 13 is not performed. In the fifth embodiment, in the cross section perpendicular to the rotation axis of the photosensitive drum 1, in the rotation direction of the photosensitive drum 1, the intersection point B is located on a side upstream of a downstream end of the contact region of the surface of the photosensitive drum 1 in contact with the brush 10 in the rotation direction of the photosensitive drum 1. In addition, an exposed area contains at least a part of the contact region. In other words, the intersection point B exists in the contact region. The intersection point B corresponds to an upstream-side end portion of the exposed area in the contact region.

7. Effect of Fifth Embodiment

To describe an effect occurring in the configuration in the fifth embodiment, a description will be given of a problem in the third reference example.

Figure 14:
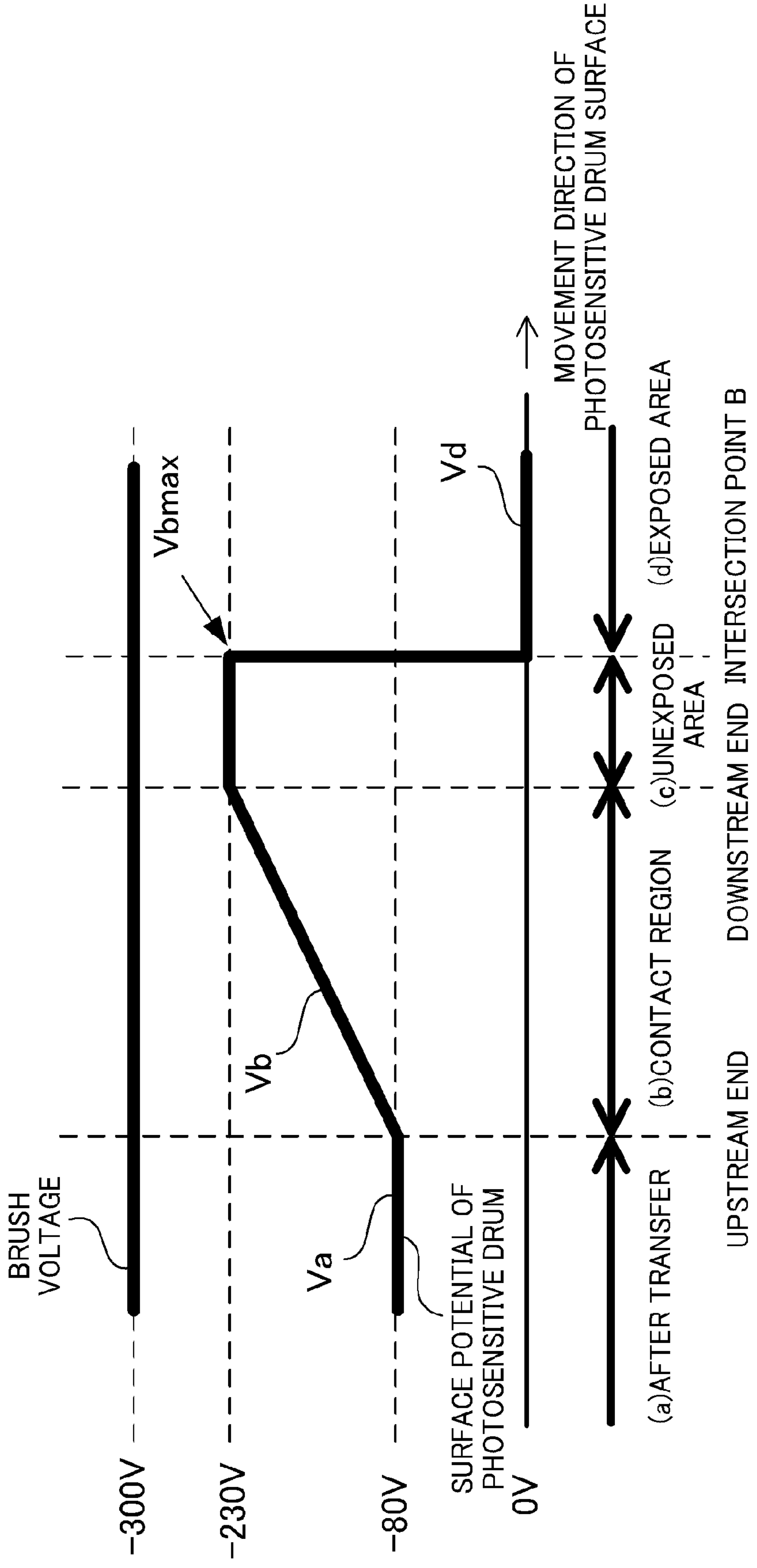
FIG. 14 is a diagram illustrating various potential relationships in the third reference example.

When the image forming operation (job) is performed in the image forming apparatus 100 and the transportation of the recording material S is started, the untransferred toner, which has not been transferred onto the recording material S during the transfer step, is generated on the photosensitive drum 1A. The untransferred toner moves to the contact region with the brush 10A, and may stay in the contact region instead of passing through the contact region. A description will be given of this phenomenon with reference to FIG. 14. FIG. 14 is a diagram illustrating a change in the surface potential of the photosensitive drum 1A after the transfer in a transfer portion in the third reference example. In FIG. 14, a section (a) shows a variation of a surface potential Va of the photosensitive drum 1A on a side downstream of the transfer portion and upstream of the contact region, while a section (b) shows a variation of a surface potential Vb of the photosensitive drum 1A in the contact region. Meanwhile, a section (c) shows a variation of the surface potential of the photosensitive drum 1A on a side downstream of the contact region and upstream (unexposed area) of the exposed area, while a section (d) shows a variation of a surface potential Vd of the photosensitive drum 1A in the exposed area. It can also be said that the section (d) shows a variation of the surface potential of the photosensitive drum 1A on a side downstream of a lower end portion of the contact region and upstream of the charging portion.

First, the post-transfer surface potential Va of the photosensitive drum 1A in the transfer portion in the third reference example is −80 V. In the fifth embodiment, the bright potential Vl is −100 V but, as described above, under the influence of the transfer, the post-transfer surface potential Va of the portion that was at the bright potential has an absolute value smaller than that of the bright potential Vl, and is −80 V in the fifth embodiment. A value of the surface potential is exemplary. Even when no consideration is given to a surface potential change under the influence of the transfer, the effect of the present invention described later is similarly obtainable. Then, during passage through the contact region, the surface potential Vb of the photosensitive drum 1A gradually increases to −230 V at the time of passing through the downstream end of the contact region. Note that the increase of the absolute value of a negative-polarity potential is referred to herein as a "potential increase". The surface potential Vb during the passage through the contact region with the brush 10A cannot directly be measured but, from a potential change before and after the passage through the contact region, the following assumption can be derived. Specifically, it is assumed that, during the passage through the contact region, by the brush voltage, negative-polarity charges are injected from the brush 10A into the surface of the photosensitive drum 1A to consequently increase the surface potential. Since the brush voltage is −300 V and constant, the brush voltage and a potential difference between the surface potential Vb of the photosensitive drum 1A and the brush voltage gradually decrease during the passage through the contact region. The contact region does not have a part that satisfies $|Vb|<|Va|$, and $|Vb|\geq|Va|$ is constantly satisfied. In addition, in the contact region, the surface potential Vb of the photosensitive drum 1A does not decrease, and the surface potential Va on a side upstream of the contact region is higher than the surface potential Vd in the exposed area on a side downstream of the contact region. Consequently, the contact region does not have a part that satisfies $|Va-Vb|>|Vb-Vd|$, and $|Va-Vb|\leq|Vb-Vd|$ is constantly satisfied.

As a result, in the contact region, an electrostatic force acting on the negative-polarity untransferred toner acts in a direction extending from the brush 10A toward the photosensitive drum 1A, and a magnitude of the force decreases with increasing approach to a downstream end side of the contact region. Accordingly, it can be considered that, in the vicinity of the downstream end of the contact region, the negative-polarity untransferred toner is more likely to be collected by the brush 10A.

As a result, in the third reference example, the untransferred toner staying in the vicinity of the downstream end of the contact region increases, and the untransferred toner that can no longer be held by the brush 10A is discharged from the brush 10A. In such a case where the untransferred toner is not collected in the developing portion, a toner discharge image formed as an image on the recording material may appear.

Figure 15A:
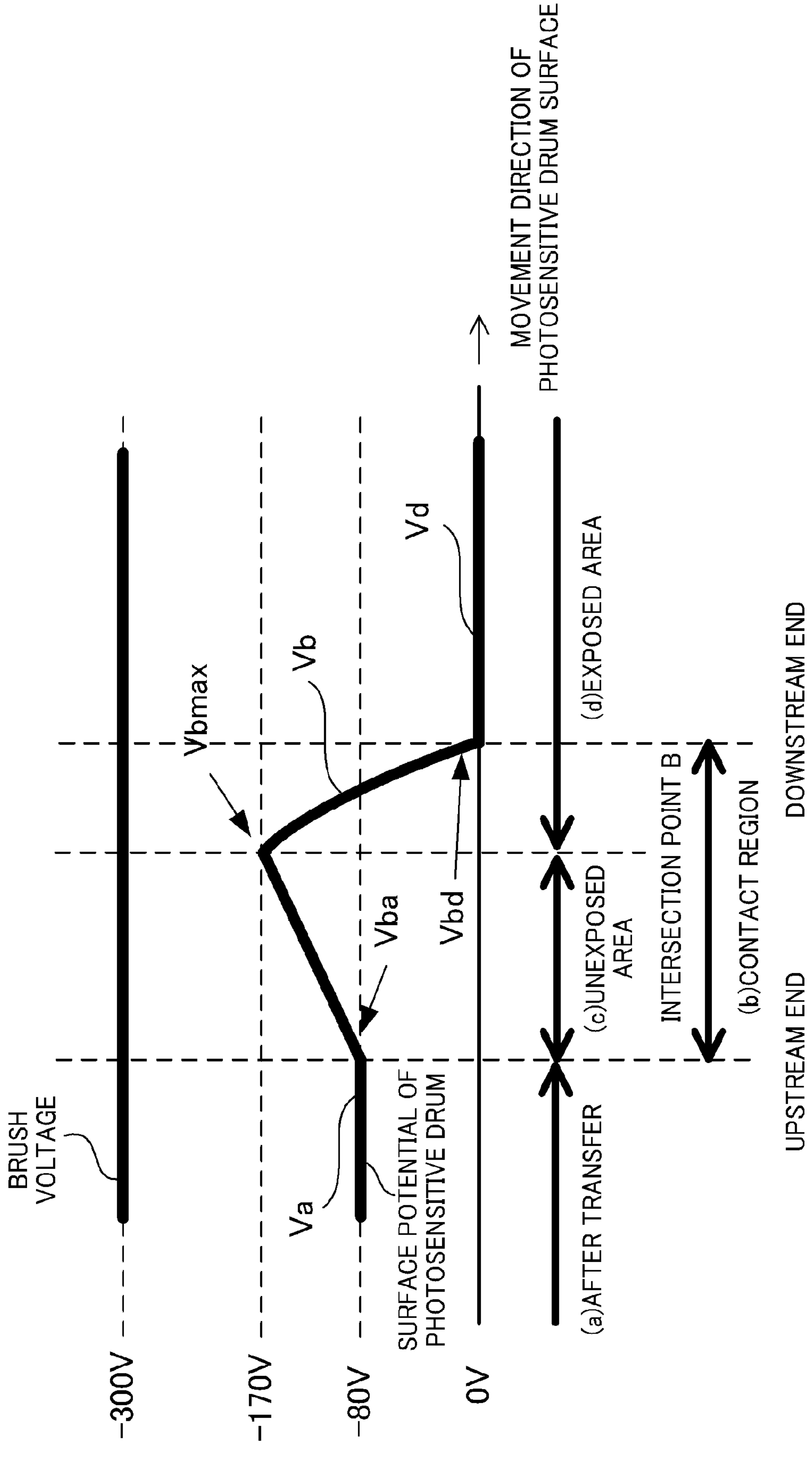
FIG. 15A is a diagram illustrating a potential relationship in one of three patterns in the fifth embodiment.
Figure 15B:
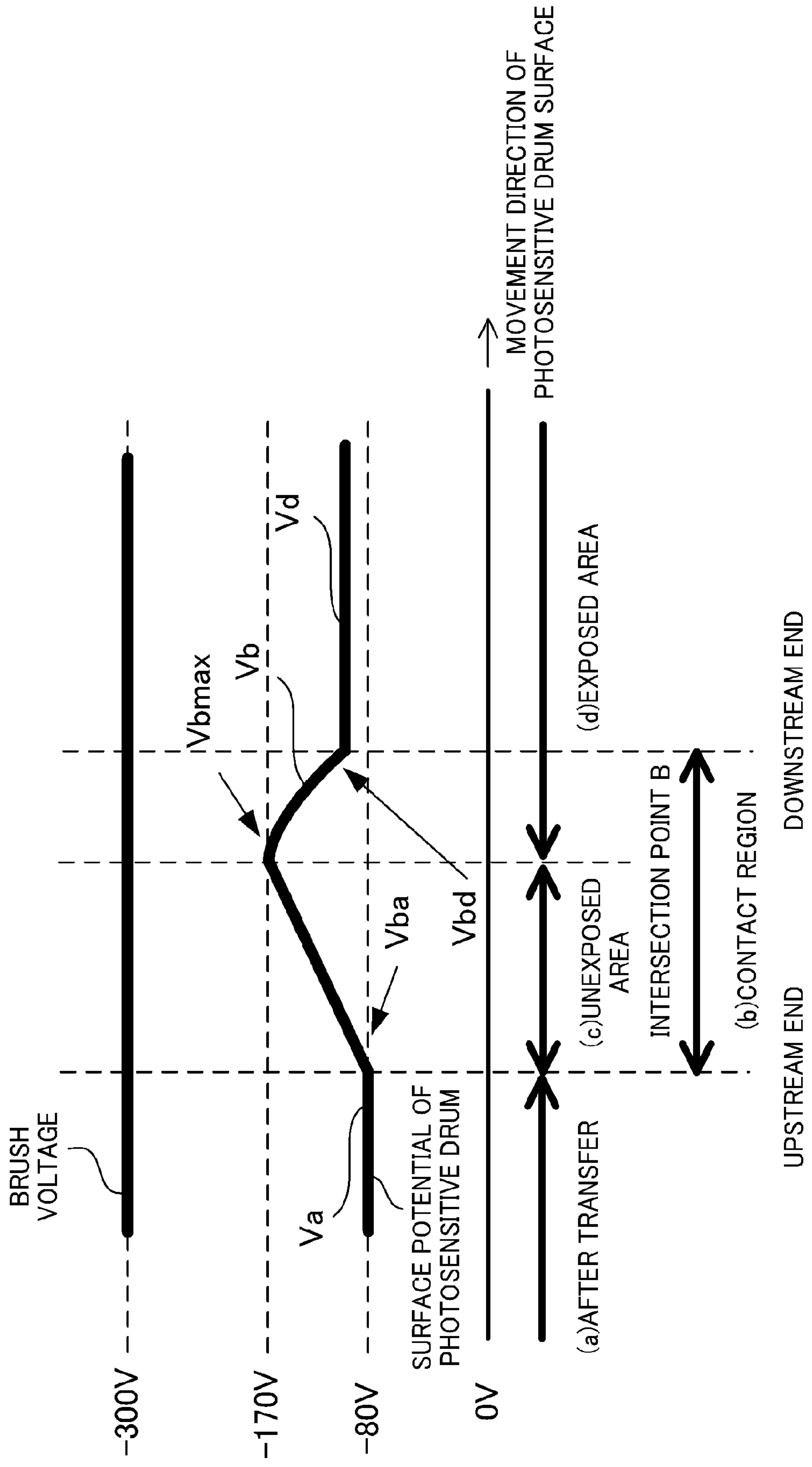
FIG. 15B is a diagram illustrating a potential relationship in one of three patterns in the fifth embodiment.
Figure 15C:
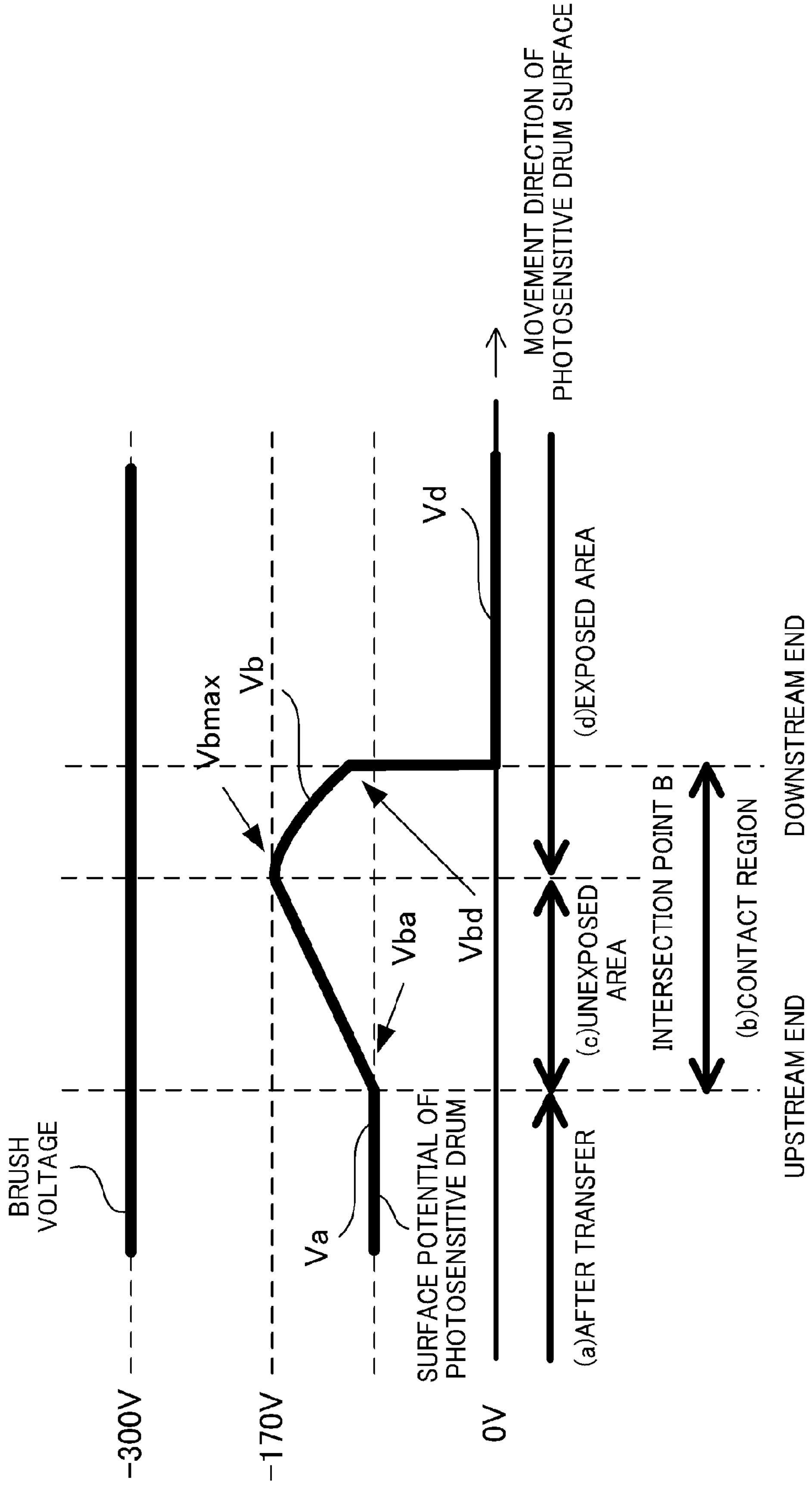
FIG. 15C is a diagram illustrating a potential relationship in one of three patterns in the fifth embodiment.

In view of a problem in the third reference example as described above, a description will be given of the effect of the fifth embodiment with reference to FIG. 15A to 15C. FIGS. 15A to 15C are diagrams each illustrating a variation of the surface potential of the photosensitive drum 1 after the transfer in the transfer portion in the fifth embodiment. In each of FIGS. 15A to 15C, the section (a) shows a variation of the surface potential Va of the photosensitive drum 1 on a side downstream of the transfer portion and upstream of the contact region, while the section (b) shows a variation of the surface potential Vb of the photosensitive drum 1 in the contact region. Meanwhile, the section (c) shows a variation of the surface potential of the photosensitive drum 1 on a side downstream of the contact region and upstream (unexposed area) of the exposed area, while the section (d) shows a variation of the surface potential Vd of the photosensitive drum 1 in the exposed area. It can also be said that the section (d) shows a variation of the surface potential of the photosensitive drum 1 on a side downstream of a lower end portion of the contact region and upstream of the charging portion.

In the fifth embodiment, as illustrated in FIG. 13, in a cross section perpendicular to the rotation axis of the photosensitive drum 1, the intersection point B between the most-upstream-side optical path A among the irradiation optical paths due to the pre-exposing device 13 and the surface of the photosensitive drum 1 is located on a side upstream of the downstream end of the contact region in the rotation direction of the photosensitive drum 1. As a result, a part of the irradiating light from the pre-exposing device 13 irradiates the yarn portion 11 of the brush 10, and the irradiating light not blocked by the yarns 11*a* of the yarn portion 11 exposes the surface of the photosensitive drum 1. Accordingly, as illustrated in FIG. 15A, variations of the surface potential Va of the photosensitive drum 1 and the surface potential Vb of the photosensitive drum 1 in the unexposed area of the contact region after the transfer are the same as those in the third reference example before reaching the intersection point B, i.e., before entering the exposed area.

However, after passing through the intersection point B, i.e., after entering the exposed area due to the pre-exposing device 13, the surface potential Vb of the photosensitive drum 1 gradually decreases, and $|Vb|$ decreases with increasing approach to the downstream end of the contact region. This is because the irradiating light from the pre-exposing device 13 passes through gaps between the yarns 11*a* of the brush 10 to expose the surface of the photosensitive drum 1 in the contact region. As a result, after passing through the intersection point B, the potential difference between the brush voltage and the surface potential Vb of the photosensitive drum 1 increases. At this time, as is obvious from FIG. 15A, there is a region that satisfies $|Vb|<|Va|$.

It is assumed that, for the surface potential Vb of the photosensitive member in the contact region, a potential at the intersection point B is Vbmax, a potential on a side upstream of the intersection point B and in the vicinity of the upstream end of the unexposed area of the contact region is Vba, and a potential on a side downstream of the intersection point B and in the vicinity of a downstream end of the exposed area in the contact region is Vbd. Vbmax represents a surface potential of the photosensitive drum 1 at an upstream-side end portion of the exposed area of the contact region. In other words, Vbmax corresponds to an area of the contact region in which the upstream-side end portion of the exposed area is not neutralized and a largest number of charges have been injected, and therefore has a largest absolute value among Vb's. Vbd represents a surface potential in the vicinity of a downstream-side end portion of a region where the contact region and the exposed area overlap each other. After passing through the intersection point B, |Vb| gradually decreases from |Vbmax| to |Vbd|. Accordingly, in the fifth embodiment, the brush member and the pre-exposing device 13 are disposed so as to satisfy |Vbmax|>|Vbd|. The variation of Vb increases the potential difference between the brush voltage and Vb, and the untransferred toner is less likely to be collected by the brush 10. As a difference between |Vbmax| and |Vbd| is larger, the potential difference between the brush voltage and the surface potential Vb of the photosensitive drum 1 is in a direction of further increasing, and consequently the collection of the untransferred toner is further suppressed. Note that, in the configuration in the third reference example described above, |Vbmax|=|Vbd| is satisfied, and accordingly the untransferred toner staying in the vicinity of the downstream end of the contact region undesirably increases.

For example, FIG. 15A illustrates a case where, in the contact region, the surface potential Vb of the photosensitive drum 1 changes from rising to falling to be lower than Va in the contact region. In this case, relationships among Va, Vbd, and Vbmax satisfy |Vbd|<|Vba|<|Vbmax|. Accordingly, in such a case as in FIG. 15A, relationships among Va, Vb (Vbd), and Vd satisfy |Vba−Vbmax|<|Vbmax−Vbd|, which represents a large potential change from Vbmax to Vbd.

Meanwhile, in such a case as when the brush 10 has a high density, an exposure intensity due to the pre-exposing device 13 in the contact region is low, and the surface potential Vb of the photosensitive drum 1 in the exposed area is unlikely to decrease, as illustrated in FIG. 15B, |Vbd|≥|Vba| may be satisfied. Note that, in such a case as in FIG. 15B also, the presence of the intersection point B within the contact region increases the potential difference between the brush voltage and the surface potential Vb of the photosensitive drum 1 in a downstream-side area in the contact region, in the same manner as in the case in FIG. 15A. However, the degree of the increase is smaller than that in the case in FIG. 15A.

Note that, in the fifth embodiment, the exposed area due to the pre-exposing device 13 is present in the contact region, but it can be considered that, since the irradiating light is blocked to a degree by the yarn portion 11 of the brush 10, a degree of a surface potential reduction due to the exposure is lower inside the contact region than outside the contact region. Consequently, as illustrated in FIG. 15C, in the exposed area, a potential change appears such that the surface potential significantly decreases discontinuously beyond the downstream end of the contact region, i.e., a position no longer affected by the light blocking by the brush 10 serving as a boundary. In this case also, as illustrated in FIG. 15C, the presence of the intersection point B in the contact region increases the potential difference between the brush voltage and the surface potential Vb of the photosensitive drum 1 in a downstream-side area in the contact region to satisfy |Vbmax|>|Vbd|. As a result, an effect such that the untransferred toner is less likely to be collected by the brush 10 can be obtained.

In any of the cases in FIGS. 15A to 15C, a common point is that, in the contact region, a portion in which the surface potential of the photosensitive drum 1 changes from rising to falling due to the exposure by the pre-exposing device 13 is present, which is an essential characteristic feature of the present invention. In other words, in the contact region, a portion in which the potential difference between the surface potential of the photosensitive drum 1 and the brush voltages changes from decreasing to increasing due to the exposure by the pre-exposing device 13 is present. As a result, in any of the cases in FIGS. 15A to 15C, it can be said that, through the exposure of the surface of the photosensitive drum 1 by the pre-exposing device 13, the surface potential is formed on the photosensitive drum 1 so as to satisfy |Vbmax|>|Vbd|.

Consequently, in the contact region on the side downstream of the intersection point B, the electrostatic force acting on the negative-polarity untransferred toner acts in the direction extending from the brush 10 toward the photosensitive drum 1, and a magnitude of the force increases with increasing approach to the downstream end side of the contact region. As a result, in the vicinity of the downstream end of the contact region also, the untransferred toner is less likely to be collected by the brush 10, and is inhibited from staying.

Thus, in the fifth embodiment, it is possible to suppress formation of the toner discharge image resulting from the increased untransferred toner staying in the vicinity of the lower end of the contact region.

8. Effect of Fifth Embodiment

Figure 16B:
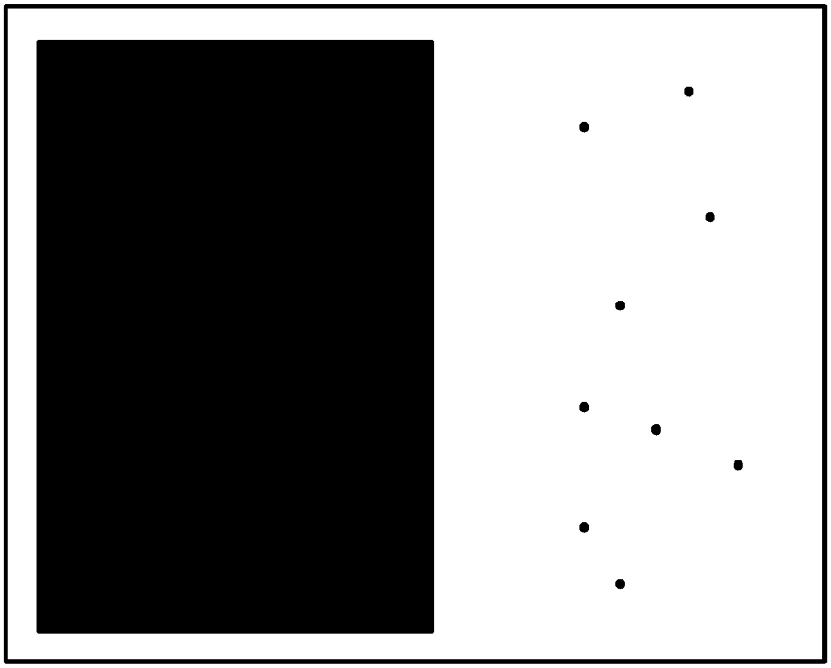
FIGS. 16A and 16B are diagrams illustrating sheet passing images to be used in a sheet passing test in the fifth embodiment and the resulting image defect.
Figure 16A:
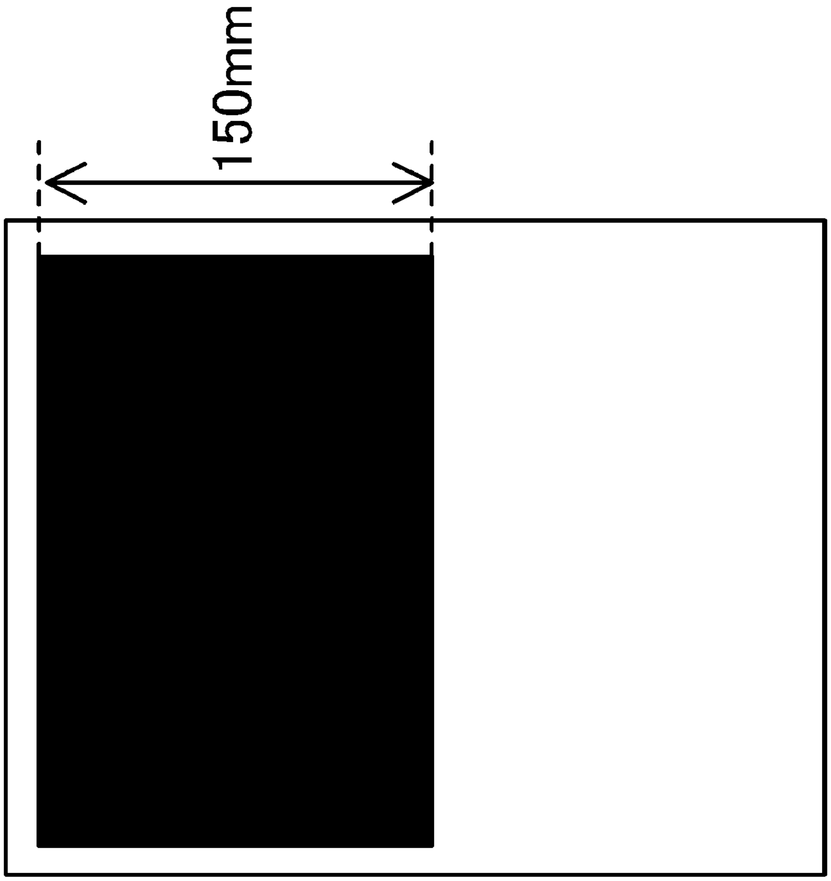

Next, a description will be given of a sheet passing test performed to verify the effect of the fifth embodiment. The sheet passing experiment was performed under the following conditions. Under an environment in which a temperature was 23° C. and a relative humidity was 50%, Xerox Vitality Multipurpose Paper (Letter-sized 201b) was used as the recording material S. As an evaluation image, an image in which an upper half of an image formation region is a black image and a lower half thereof is a white image as illustrated in FIG. 16A was used. By using this evaluation image, the untransferred toner generated with the image formation of the upper-half black image is sent into the brush. When the untransferred toner that could not pass through the brush stays on the brush, due to the untransferred toner, the toner discharge image is formed on the region with the lower-half white image, as illustrated in FIG. 16B. As a result, it is possible to determine, on the basis of the presence or absence of the toner discharge image in the region with the white image, whether or not the stay and discharge of the untransferred toner has occurred in the brush. In the sheet passing test, 50 sheets each having the evaluation image were continuously passed, and it was checked whether or not the toner discharge image was formed on the lower-half white image region of the image during the continuous sheet passing. In the configurations in the third reference example and the fifth embodiment, the sheet passing test was performed, and a result of counting, in units of 10, the number of the sheets on each of which the toner discharge image was formed is shown in Table 5.

TABLE 5

| | 1-10 SHEETS | 11-20 SHEETS | 21-30 SHEETS | 31-40 SHEETS | 41-50 SHEETS |
|---|---|---|---|---|---|
| THIRD REFERENCE EXAMPLE | 1 | 1 | 2 | 3 | 3 |
| FIFTH EMBODI-MENT | 0 | 0 | 0 | 0 | 0 |

From the results shown in Table 5, it was understood that, in the fifth embodiment, in contrast to the third reference example, it was possible to suppress the formation of the toner discharge image. Note that each of the values in Table 5 represents the number of the sheets on each of which the toner discharge image was formed, and the degree (number or size) of the toner discharge image was not considered. However, it can be considered that, even in a case where a comparison is made between the degrees, the degree in the fifth embodiment is lower than that in the third reference example.

Thus, with the configuration in the fifth embodiment, it is possible to inhibit the toner discharge image from being formed due to the accumulation of the untransferred toner on the brush. By way of example, the fifth embodiment has described the case where the light from the pre-exposing device 13 irradiates the gap between the brush 10 and the charging roller 2 due to the location thereof. However, even in a case where the pre-exposing device 13 is located on a side more upstream of the position thereof in FIG. 13 to emit light from downstream of the brush 10 and further irradiate the surface of the photosensitive drum 1 on a side upstream of the brush 10 through the back side of the brush 10 also, the same effect can be obtained.

Figure 17:
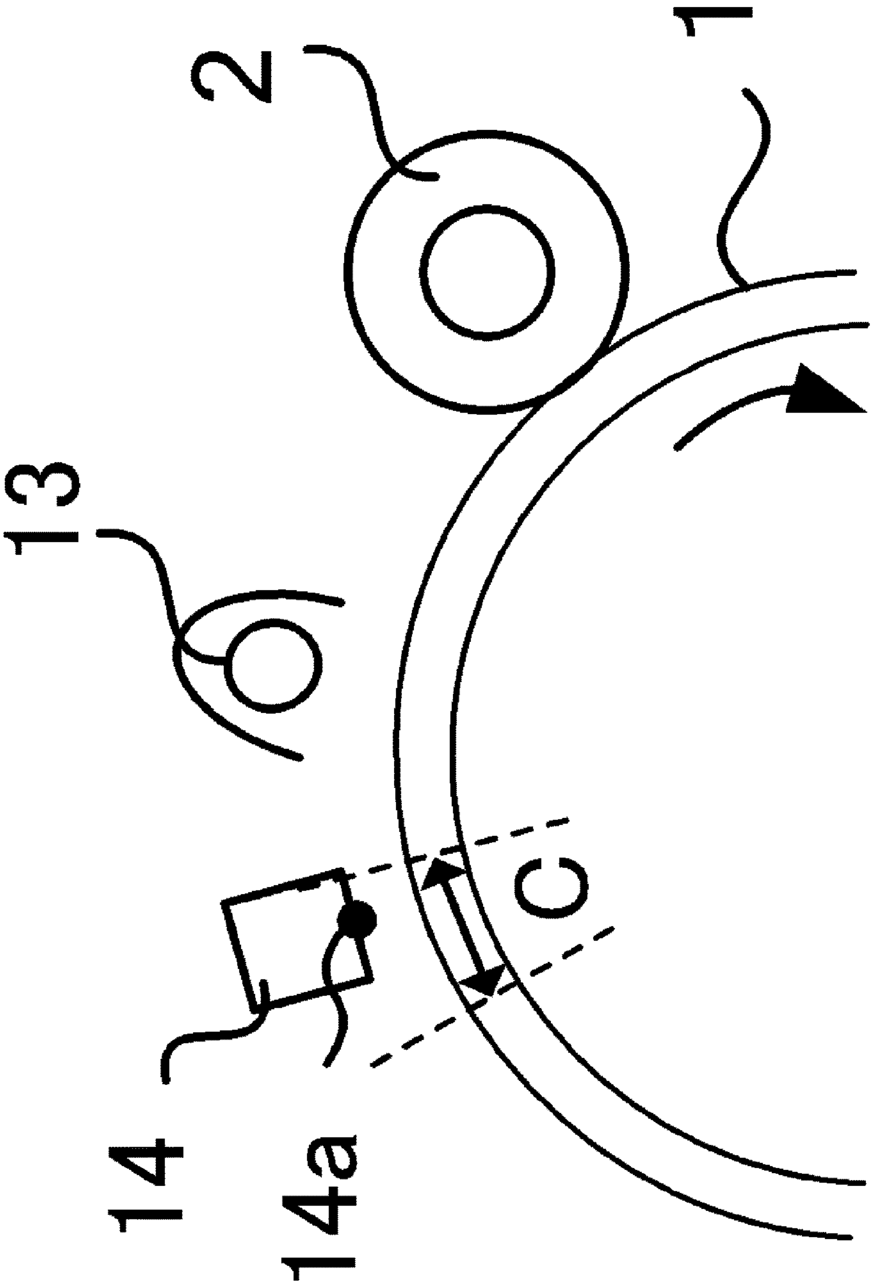
FIG. 17 is a cross-sectional view illustrating a method of verifying the potential relationships in the fifth embodiment.

Next, referring to FIG. 17, a description will be given of a verification method of verifying whether or not the exposed area due to the pre-exposing device 13 has reached a side upstream of the downstream end of the contact region, as in the fifth embodiment. FIG. 17 is a diagram in which the brush 10 in FIG. 13 has been removed, and a measurement probe 14 of a surface potential meter (Model 344 manufactured by Trek Incorporated) is disposed instead. A measuring portion 14*a* of the measurement probe 14 is disposed so as to measure the surface potential of the photosensitive drum 1 at a position close to a downstream end of a region C corresponding to the contact region before the removal of the brush 10 in the region C.

Under measurement conditions as described above, the surface potential of the photosensitive drum 1 during the image forming operation is measured. First, a surface potential Von of the photosensitive drum 1 is measured in a state where the pre-exposing device 13 performs exposure. Then, a state where the pre-exposing device 13 does not expose the surface of the photosensitive drum 1 is produced, and a surface potential Voff of the photosensitive drum 1 in that state is measured. It can be said that, when the region C corresponding to the contact region has a portion that satisfies $|Von|<|Voff|$, the contact region has a portion that satisfies $|Von|<|Voff|$. It can be determined that the exposed area due to the pre-exposing device 13 has reached the side upstream of the downstream end of the contact region, i.e., the exposed area and the contact region have a common portion therebetween and have respective portions overlapping each other.

Sixth Embodiment

Next, a description will be given of a sixth embodiment of the present invention. A basic configuration and an operation of an image forming apparatus in the sixth embodiment are the same as those of the image forming apparatus in the fifth embodiment. Therefore, in the image forming apparatus in the sixth embodiment, a detailed description of components having functions or configurations which are the same as or correspond to those of the components of the image forming apparatus in the fifth embodiment will be omitted by using the same reference signs as those used in the image forming apparatus in the fifth embodiment.

From the viewpoint of the collectivity of the paper dust, the fineness of the yarns 11*a* of the brush 10 and the density of the yarns 11*a* in the yarn portion 11 in the sixth embodiment are respectively 1 to 6 denier and 150 to 350 kF/inch$^2$ in the same manner as in the fifth embodiment. Meanwhile, as the fineness and density are higher, the light from the pre-exposing device 13 is more likely to be blocked, and the effect of reducing the surface potential of the photosensitive drum 1 in the contact region decreases to accordingly reduce the effect of promoting the passage of the untransferred toner. Accordingly, in the sixth embodiment, a description will be given of a configuration that allows the untransferred toner to more effectively pass through the brush, while ensuring the paper dust collectivity of the brush.

1. Configuration of Sixth Embodiment

Figure 18A:
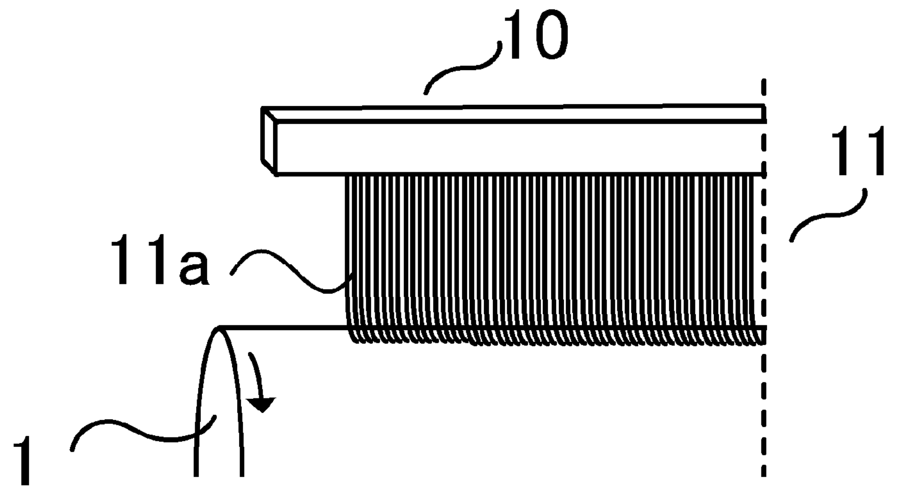
FIGS. 18A and 18B are diagrams illustrating brush configurations in the fifth embodiment and a sixth embodiment for comparison.
Figure 18B:
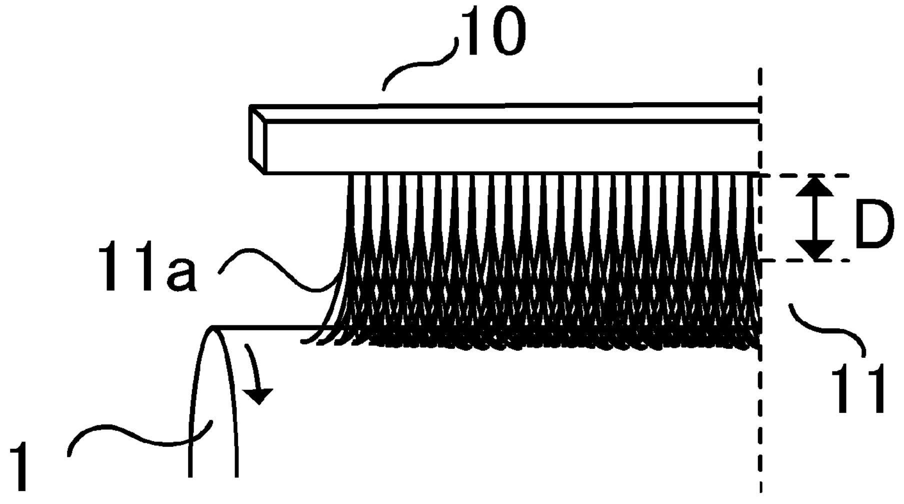

Referring to FIGS. 18A and 18B, a description will be given of a configuration of the brush 10 in the sixth embodiment. FIGS. 18A and 18B are perspective views obtained by viewing the brush 10 from a downstream side in the rotation direction of the photosensitive drum 1. The light is emitted from the pre-exposing device 13 from a front side of the paper sheet with FIGS. 18A and 18B to a back side thereof. FIG. 18A is a diagram illustrating the brush 10 in the fifth embodiment, while FIG. 18B is a diagram illustrating the brush 10 in the sixth embodiment. In the brush 10 in the fifth embodiment, an arrangement of the yarns 11*a* in the yarn portion 11 is substantially uniform from the roots thereof on the base fabric 11*b* to the yarn tips thereof corresponding to the contact portion with the surface of the photosensitive drum 1. By contrast, the brush 10 in the sixth embodiment has a form of a pile fabric in which, from the base fabric 11*b*, a plurality of pile yarns extend at regular intervals, and the yarns 11*a* evenly spread with increasing approach to the yarn tips. In other words, in a direction in which the yarns are raised in the yarn portion 11, the arrangement of the yarns 11*a* is more uniform in the vicinity of the yarn tips than in the vicinity of the roots closer to the base fabric 11*b*.

2. Effect of Sixth Embodiment

Figure 19:
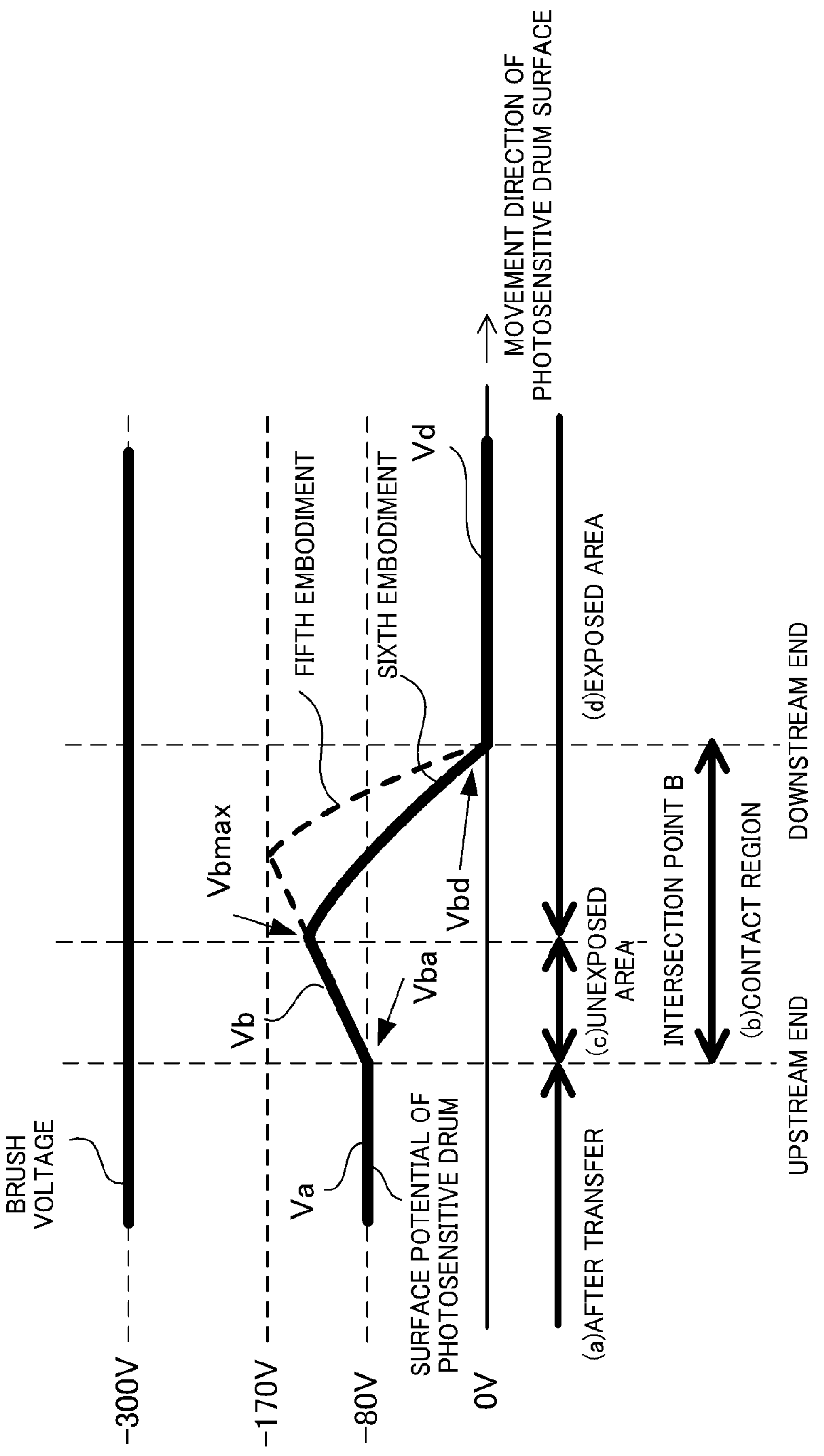
FIG. 19 is a diagram illustrating the various potential relationships in the fifth and sixth embodiments for comparison.

Next, a description will be given of an effect occurring in a configuration in the sixth embodiment. In the brush 10 in the fifth embodiment illustrated in FIG. 18A, gaps between the yarns 11*a* through which the light from the pre-exposing device 13 is to pass are uniform from the yarn tips to the roots. By contrast, in the brush 10 in the sixth embodiment illustrated in FIG. 18B, the gaps between the yarns 11*a* through which the light from the pre-exposing device 13 is to pass are wider in the vicinity of roots D than in the vicinity of the yarn tips. A part of the irradiating light from the pre-exposing device 13 irradiates the part of the yarn portion 11 of the brush 10 closer to the base fabric 11*b*, i.e., a root part of the yarn portion 11. In the sixth embodiment, the gaps between the yarns 11*a* are wider in the root part of the yarn portion 11 than in the vicinity of the yarn tips, and accordingly the irradiating light from the pre-exposing device 13 is less likely to be blocked and more likely to pass through the brush 10, and the irradiating light from the pre-exposing device 13 reaches a more upstream side of the surface of the photosensitive drum 1. Consequently, the intersection point B between the most-upstream-side optical path A of the irradiating light from the pre-exposing device 13 and the surface of the photosensitive drum 1 is located on a more upstream side. As a result, as illustrated in FIG. 19, a starting position (position of the intersection point B) of the exposed area in the contact region is on a more upstream side, and accordingly the surface potential of the photosensitive drum 1 in the contact region is gradually lower from the more upstream side. Therefore, it is possible to more effectively inhibit the toner discharge image due to the stay of the untransferred toner.

3. Effect of Sixth Embodiment

To verify the effect of the sixth embodiment, a result of performing the same sheet passing test as described in the fifth embodiment is shown in Table 6.

TABLE 6

| | 1-10 SHEETS | 11-20 SHEETS | 21-30 SHEETS | 31-40 SHEETS | 41-50 SHEETS |
|---|---|---|---|---|---|
| FIFTH EMBODIMENT | 0 | 0 | 1 | 1 | 2 |
| SIXTH EMBODIMENT | 0 | 0 | 0 | 0 | 0 |

From the result in Table 6, it was understood that, in the sixth embodiment, the formation of the toner discharge image could more reliably be suppressed than in the fifth embodiment.

As described above, the configuration in the sixth embodiment can inhibit the toner discharge image from being formed due to the accumulation of the untransferred toner on the brush.

Seventh Embodiment

Next, a description will be given of a seventh embodiment of the present invention. A basic configuration and an operation of an image forming apparatus in the seventh embodiment are the same as those in the image forming apparatus in the fifth embodiment. Therefore, in the image forming apparatus in the seventh embodiment, a detailed description of components having functions or configurations which are the same as or correspond to those of the components of the image forming apparatus in the fifth embodiment will be omitted by using the same reference signs as those used in the image forming apparatus in the fifth embodiment.

In the seventh embodiment also, a description will be given of a configuration that allows the untransferred toner to more effectively pass through the brush, while ensuring the paper dust collectivity of the brush.

1. Configuration of Seventh Embodiment

Figure 20A:
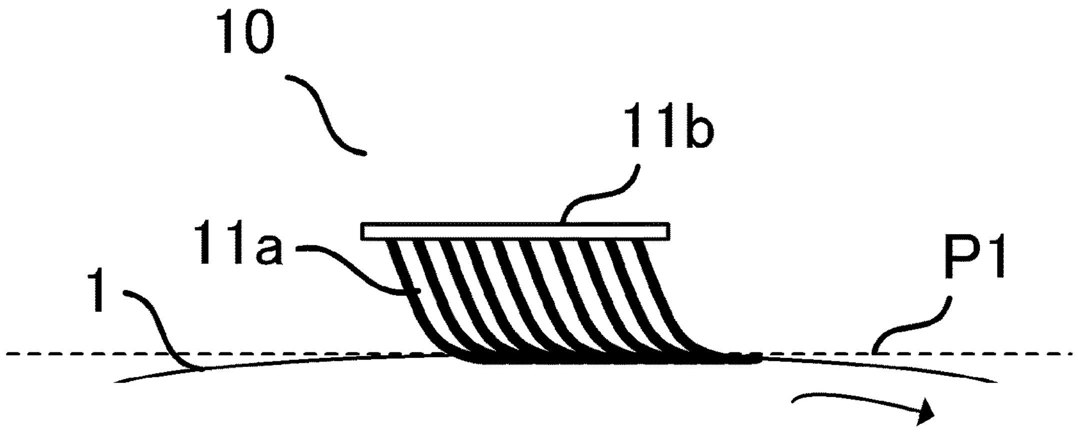
FIGS. 20A and 20B are cross-sectional views illustrating brush contact states in the fifth embodiment and a seventh embodiment for comparison.
Figure 20B:
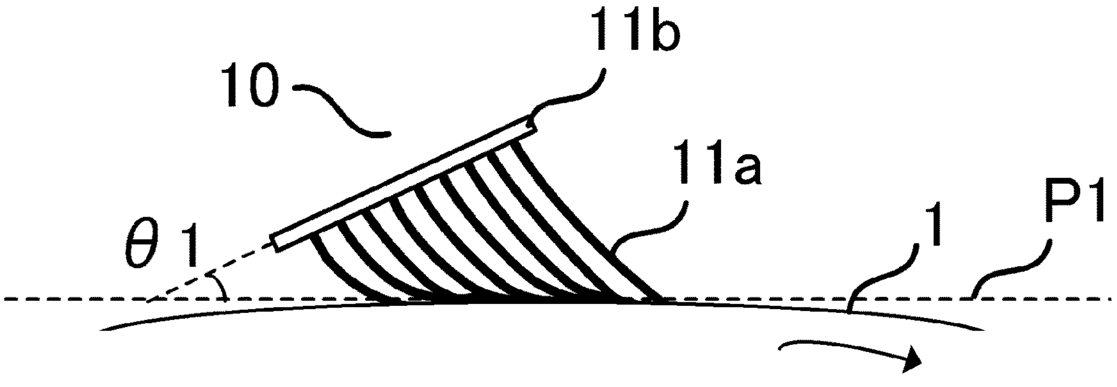

Referring to FIGS. 20A and 20B, a description will be given of a configuration of the brush 10 in the seventh embodiment. FIGS. 20A and 20B are diagrams each illustrating a cross section made of a virtual surface of the brush 10 perpendicular to the rotation axis of the photosensitive drum 1. FIG. 20A illustrates the brush 10 in the fifth embodiment, while FIG. 20B illustrates the brush 10 in the seventh embodiment. In the brush 10 in the fifth embodiment, the lengths of the individual yarns 11*a* in the yarn portion 11 are equal, and the base fabric 11*b* is fixed so as to be parallel to a virtual contact plane P1 on the surface of the photosensitive drum 1 in the middle portion of the contact region. Accordingly, penetration levels of the yarns 11*a* are substantially uniform throughout the entire area in the contact region (from the upstream end to the downstream end), and 11*a* are evenly in contact with the surface of the photosensitive drum 1 in the contact region.

Meanwhile, in the brush 10 in the seventh embodiment, the lengths of the individual yarns 11*a* in the yarn portion 11 are equal, and the base fabric 11*b* is inclined at an angle θ1 with respect to the virtual contact plane P1 on the surface of the photosensitive drum 1 at the middle portion of the contact region on an upstream side in the rotation direction of the photosensitive drum 1 (direction reverse to the rotation direction). Accordingly, the penetration levels of the yarns 11*a* are largest at the upstream end in the contact region, and gradually decrease with increasing approach to the downstream end.

In the fifth embodiment, the penetration level of each of the yarns 11*a* is 1.5 mm and substantially uniform from the upstream end to the downstream end in the contact region. In the seventh embodiment, the penetration level of each of the yarns 11*a* is 2.5 mm at the upstream end of the contact region, and is 0.5 mm at the downstream end thereof.

2. Effect of Seventh Embodiment

Figure 21:
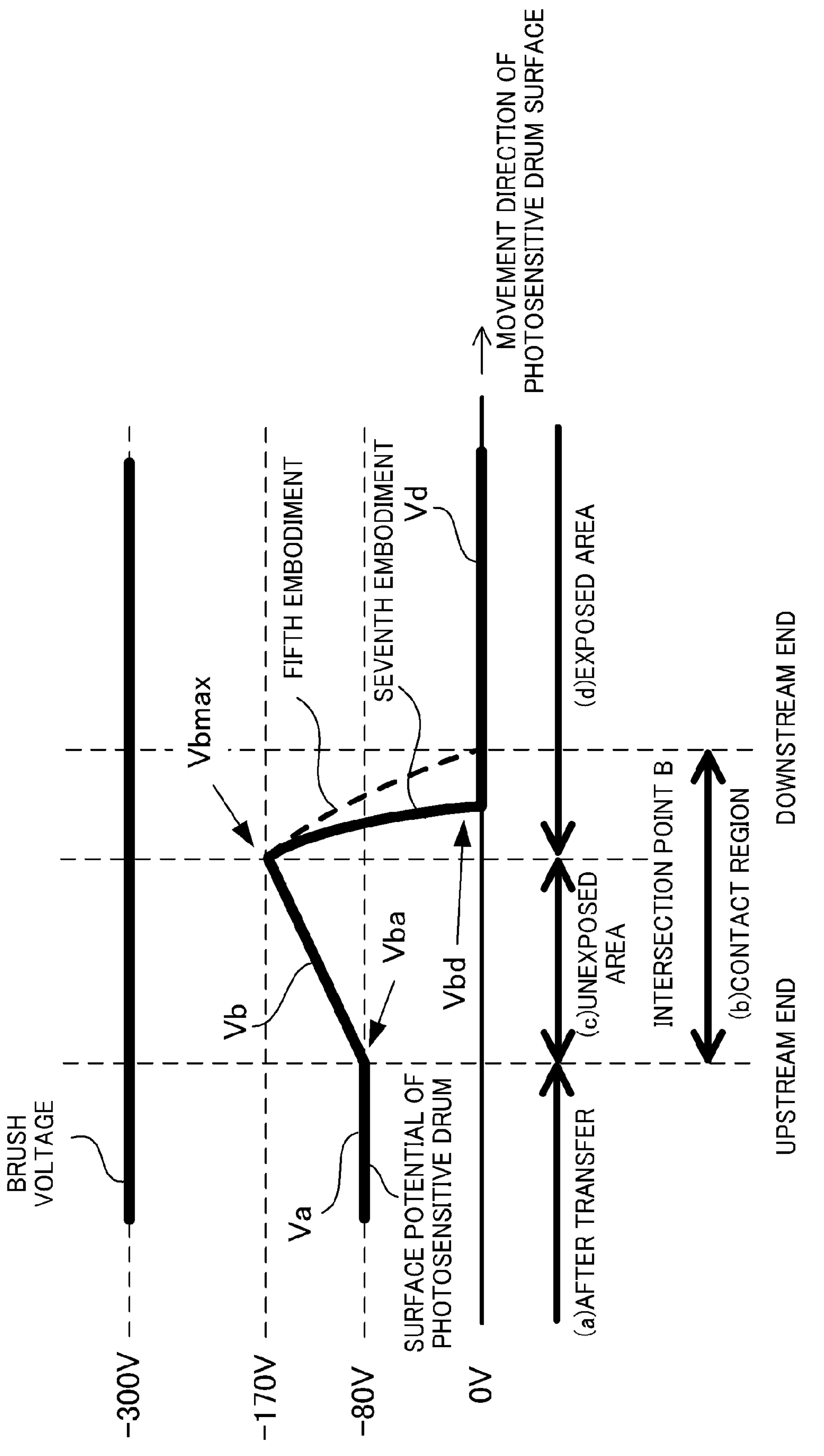
FIG. 21 is a diagram illustrating the various potential relationships in the fifth and seventh embodiments for comparison.

Next, a description will be given of an effect occurring in a configuration in the seventh embodiment. In the fifth embodiment, as illustrated in FIG. 20A, the penetration levels of the yarn tips of the yarns 11*a* of the brush 10 are about 1.5 mm and uniform throughout the entire area of the contact region. Meanwhile, in the seventh embodiment, as illustrated in FIG. 20B, the penetration levels of the yarn tips of the yarns 11*a* in the vicinity of the upstream end of the contact region are about 2.5 mm and larger than those in the fifth embodiment, and an effect of damming paper dust at the upstream end is higher than that in the fifth embodiment. In addition, the penetration levels of the yarns 11*a* in the vicinity of the downstream end of the contact region are about 0.5 mm and smaller than those in the fifth embodiment, and accordingly a contact area between the yarns 11*a* and the surface of the photosensitive drum 1 are smaller, and the light from the pre-exposing device 13 is more likely to irradiate the surface of the photosensitive drum 1. Therefore, as illustrated in FIG. 21, it is possible to more effectively reduce the surface potential of the photosensitive drum 1 due to the exposure by the pre-exposing device 13 in the vicinity of the downstream end of the contact region.

As a result, the brush 10 in the seventh embodiment has paper dust collection performance equal to or more than that in the fifth embodiment, and can more reliably suppress the formation of the toner discharge image due to the accumulation of the untransferred toner.

3. Effect of Seventh Embodiment

To verify the effect of the seventh embodiment, a result of performing the same sheet passing test as described in the fifth embodiment is shown in Table 7.

TABLE 7

| | 1-10 SHEETS | 11-20 SHEETS | 21-30 SHEETS | 31-40 SHEETS | 41-50 SHEETS |
|---|---|---|---|---|---|
| FIFTH EMBODIMENT | 0 | 0 | 1 | 1 | 2 |
| SEVENTH EMBODIMENT | 0 | 0 | 0 | 0 | 0 |

From the result in Table 7, it was understood that, in the seventh embodiment, the formation of the toner discharge image could more reliably be suppressed than in the fifth embodiment.

As described above, the configuration in the seventh embodiment provides the paper dust collection performance equal to or more than that in the fifth embodiment, and can inhibit the toner discharge image from being formed due to the accumulation of the untransferred toner on the brush.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-205132, filed on Dec. 17, 2021 and Japanese Patent Application No. 2021-205087, filed on Dec. 17, 2021, which are hereby incorporated by reference herein in their entirety.

What is claimed is:

1. An image forming apparatus comprising:

an image bearing member configured to be driven to rotate;

a charging member configured to face a surface of the image bearing member to form a charging portion and charge the surface of the image bearing member;

a developing roller configured to feed a developer to the surface of the image bearing member charged by the charging member to form a developer image;

a transfer roller configured to form a transfer portion between the transfer roller and the image bearing member to transfer the developer image from the image bearing member to a transferred member; and a brush configured to be brought into contact with the surface of the image bearing member to form a brush portion on a side downstream of the transfer portion and upstream of the charging portion in a rotation direction of the image bearing member, wherein, after the transfer of the developer image onto the transferred member, the developer remaining on the surface of the image bearing member being collected by the developing roller, wherein the brush is disposed such that, in a cross section perpendicular to a rotation axis of the image bearing member, a contact region of the surface of the image bearing member in contact with the brush overlaps a virtual line containing the rotation axis of the image bearing member and extending upward from the rotation axis in a vertical direction, and wherein, in the cross section perpendicular to the rotation axis of the image bearing member, on the surface of the image bearing member, a length on the surface of the image bearing member from the transfer portion to the brush portion in the rotation direction of the image bearing member is shorter than a length on the surface of the image bearing member from the charging portion to the transfer portion in the rotation direction of the image bearing member.

2. The image forming apparatus according to claim 1, further comprising:

a pre-exposing unit configured to expose the image bearing member on a side downstream of the brush and upstream of the charging portion in the rotation direction of the image bearing member.

3. The image forming apparatus according to claim 1, wherein in the cross section perpendicular to the rotation axis of the image bearing member, an intersection point between the virtual line containing the rotation axis of the image bearing member and extending upward from the rotation axis in the vertical direction and the surface of the image bearing member is located at a middle portion of the contact region in the rotation direction of the image bearing member.

4. The image forming apparatus according to claim 1, wherein in the cross section perpendicular to the rotation axis of the image bearing member, an intersection point between the virtual line containing the rotation axis of the image bearing member and extending upward from the rotation axis in the vertical direction and the surface of the image bearing member is located on a side downstream of a middle portion of the contact region in the rotation direction of the image bearing member.

5. The image forming apparatus according to claim 1, wherein a magnitude of a pressure F1 exerted on the surface of the image bearing member by the brush is equal to or less than a magnitude of a component of a pressure F2 exerted on the surface of the image bearing member by a contact member configured to be brought into contact with the surface of the image bearing member other than the brush, and the component of the pressure F2 is in a direction parallel to the pressure F1.

6. The image forming apparatus according to claim 5, wherein in the cross section perpendicular to the rotation axis of the image bearing member, the contact member and an upstream-side end portion of the contact region in the rotation direction of the image bearing member are on opposite sides with respect to a virtual line passing through the rotation axis of the image bearing member and a middle portion of the contact region in the rotation direction of the image bearing member.

7. The image forming apparatus according to claim 5, wherein the developing roller is in contact with the surface of the image bearing member, and the contact member is the developing roller.

8. The image forming apparatus according to claim 1, wherein the charging member is in contact with the image bearing member in the charging portion.

9. The image forming apparatus according to claim 1, wherein the brush has a base fabric and a yarn portion including a plurality of yarns extending from the base fabric, and a density of the yarn portion is equal to or more than 150 kF/inch2.

10. The image forming apparatus according to claim 1, wherein, on the surface of the image bearing member, i) a length on the surface of the image bearing member between the transfer portion and the brush portion in the rotation direction of the image bearing member is defined as a first length, ii) a length on the surface of the image bearing member between the transfer portion and the charging portion is defined as a second length, and iii) a length on the surface of the image bearing member between the transfer portion and the charging portion that is longer than the second length is defined as a third length, and wherein the brush is arranged so that the first length is shorter than the second length.

11. The image forming apparatus according to claim 1, wherein the developing roller is configured to face the surface of the image bearing member to form a developing portion, wherein, on the surface of the image bearing member, the length on the surface of the image bearing member from the transfer portion to the brush portion in the rotation direction of the image bearing member is shorter than a length on the surface of the image bearing member from the developing portion to the transfer portion in the rotation direction of the image bearing member.

12. The image forming apparatus according to claim 11, wherein, on the surface of the image bearing member, i) a length on the surface of the image bearing member between the transfer portion and the brush portion in the rotation direction of the image bearing member is defined as a first length, ii) a length on the surface of the image bearing member between the transfer portion and the developing portion is defined as a fourth length, iii) a length on the surface of the image bearing member between the transfer portion and the developing portion that is longer than the fourth length is defined as a fifth length, and wherein the brush is arranged so that the first length is shorter than the fourth length.

* * * * *